United States Patent [19]

Kono et al.

[11] Patent Number: 5,620,390
[45] Date of Patent: Apr. 15, 1997

[54] MOTOR VEHICLE LOCK-UP CLUTCH CONTROL APPARATUS, HAVING MEANS FOR DETECTING CLUTCH JUDDER WITH HIGH ACCURACY

[75] Inventors: Katsumi Kono, Toyota; Shinya Nakamura, Owariasahi, both of Japan

[73] Assignee: Toyota Jidosha Kabushiki Kaisha, Toyota, Japan

[21] Appl. No.: 539,070

[22] Filed: Oct. 4, 1995

[30] Foreign Application Priority Data

Oct. 7, 1994 [JP] Japan .................................. 6-244196
Jun. 14, 1995 [JP] Japan .................................. 7-147000
Jul. 13, 1995 [JP] Japan .................................. 7-177356

[51] Int. Cl.$^6$ ............................ F16H 45/02; B60K 41/28
[52] U.S. Cl. ............................ 477/65; 192/3.31; 477/169
[58] Field of Search ............................ 192/3.31, 3.3; 477/169, 176, 65

[56] References Cited

U.S. PATENT DOCUMENTS

| 4,724,939 | 2/1988 | Lochart et al. ............................ 192/3.3 |
| 5,226,513 | 7/1993 | Shibayama ............................ 192/3.3 X |
| 5,277,287 | 1/1994 | Ishii et al. ............................ 192/3.31 |
| 5,474,506 | 12/1995 | Palansky et al. ............................ 477/176 X |

FOREIGN PATENT DOCUMENTS

| 2483649 | 12/1981 | France . |
| 3818102 | 12/1988 | Germany . |
| 60-151457 | 8/1985 | Japan . |
| 4-224363 | 8/1992 | Japan . |
| 5-172240 | 7/1993 | Japan . |

OTHER PUBLICATIONS

Patent Abstracts of Japan, vol. 16, No. 553 (M–1339), Nov. 24, 1992, JP–A–04 210130, Jul. 31, 1992.

*Primary Examiner*—Rodney H. Bonck
*Attorney, Agent, or Firm*—Oblon, Spivak, McClelland, Maier & Neustadt, P.C.

[57] ABSTRACT

An apparatus for controlling a lock-up clutch between pump and turbine impellers in a power transmitting system of a motor vehicle, including a slip control device for controlling the amount of slip of the lock-up clutch, and a judder detector for detecting a judder of the lock-up clutch based on the number of detected speed variations of the turbine impeller during slip control of the lock-up clutch by the slip control device, wherein the judder detector is inhibited from using a variation of the turbine impeller speed variation for the detection of the judder, if the amount of change of the variation amplitude is larger than a predetermined threshold or if the period of the variation is outside a predetermined range. The judder detector is preferably arranged to operate on the basis of the variation amplitude of the turbine impeller speed as compared with the variation amplitude of the output speed of an automatic transmission multiplied by the actual speed ratio of the transmission, or on the basis of a phase difference between the variation waveforms of the turbine impeller and transmission output speeds.

31 Claims, 17 Drawing Sheets

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | ○ | ○ | ○ | |
| | 2nd | ○ | ○ | ○ | | | ○ | ○ | | | ○ | ○ | |
| | 3rd | × | ○ | ○ | ○ | | ○ | | | | ○ | ○ | |
| | O/D | × | × | ○ | ○ | | ○ | | | | | | ○ |
| S | 1st | ○ | × | ○ | | | | | | ○ | ○ | ○ | |
| | 2nd | ○ | ○ | ○ | | ○ | ○ | ○ | | | ○ | ○ | |
| | 3rd | × | ○ | ○ | ○ | | ○ | | | | ○ | ○ | |
| | (O/D) | × | × | ○ | ○ | | ○ | | | | | | ○ |
| L | 1st | ○ | × | ○ | | | ○ | | ○ | ○ | ○ | ○ | |
| | 2nd | ○ | ○ | ○ | | ○ | ○ | ○ | | | ○ | ○ | |

FIG. 2

MOTOR VEHICLE LOCK-UP CLUTCH CONTROL APPARATUS, HAVING MEANS FOR DETECTING CLUTCH JUDDER WITH HIGH ACCURACY

BACKGROUND OF THE INVENTION

1. Field of the Invention

The present invention relates to an apparatus for controlling the amount of slip of a lock-up clutch provided in a power transmitting system of a motor vehicle.

2. Discussion of the Related Art

In a motor vehicle having a fluid-filled power transmitting device equipped with a lock-up clutch such as a torque converter or fluid coupling incorporating such a lock-up clutch, it is proposed to control the lock-up clutch in a slip control mode (partially slipping or engaging mode) such that an actual amount of slip (slip speed) of the lock-up clutch, namely, a difference between the speeds of a pump impeller and a turbine impeller of the power transmitting device eventually coincides with a predetermined target slip speed, for the purpose of improving the fuel economy of the vehicle while minimizing the power loss due to slipping of the lock-up clutch during acceleration of the vehicle. The slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaged state. These fully releasing, fully engaging and slip control areas are defined by parameters (e.g., throttle valve opening and vehicle running speed) indicative of the vehicle running condition. In a motor vehicle equipped with a fuel-cut device adapted to cut a supply of a fuel to the engine while the engine speed is higher than a predetermined fuel-cut speed, it is proposed to control the lock-up clutch in the slip control mode even during deceleration of the vehicle, in order to raise the engine speed and thereby increase the time duration during which the fuel supply to the engine is cut.

While the lock-up clutch is controlled in the slip control mode, the friction condition of the lock-up clutch may be unstable due to deterioration of a working oil or changing of the condition of the friction surface of the lock-up clutch. Consequently, the lock-up clutch may suffer from a phenomenon of so-called "judder" which involves a random or periodic variation or pulsation of the slip speed (amount of slip) of the lock-up clutch. It is desirable to terminate the slip control of the lock-up clutch in the event of detection of the "judder" phenomenon. The judder can be detected by monitoring a variation in the rotating speed of the output shaft of the fluid-filled power transmitting device, that is, a variation in the rotating speed of the turbine impeller. However, the rotating speed of the turbine impeller may have a periodic variation also when the vehicle is running on a bumpy road surface. It is therefore necessary to check if a detected variation in the turbine impeller speed really arises from the judder or a vehicle run on a bumpy road surface. To this end, it is proposed to interrupt the slip control of the lock-up clutch upon detection of an excessive variation in the turbine impeller speed, and check if the excessive variation continues even after the slip control of the lock-up clutch is interrupted. If the excessive variation continues after the interruption of the slip control, this indicates that the excessive variation in the turbine impeller speed is due to a vehicle run on a bumpy road surface. In this case, the slip control of the lock-up clutch is resumed. An example of a lock-up clutch control apparatus arranged as described above is disclosed in JP-A-4-224363.

Where an excessive variation in the turbine impeller speed is detected due to passage of the vehicle through a relatively narrow local raised or recessed area of a generally good road surface (e.g., paved road surface), the excessive variation does not continue for a long time, and the variation is reduced in a short time after the slip control of the lock-up clutch is interrupted. In this case, the lock-up clutch control apparatus indicated above erroneously determines that the detected excessive variation in the turbine impeller speed was due to the judder, even though the excessive variation was in fact due to the instantaneous passage of the vehicle through such narrow local raised or recessed area of the generally good road surface. In this case, the slip control of the lock-up clutch is not resumed, although it is desirable to resume the slip control because the detected excessive variation in the turbine impeller speed is not a result of a judder of the lock-up clutch.

Also proposed is a judder detecting device as disclosed in JP-A-5-172240, wherein judder determining means is inhibited from operating to determine the presence or absence of a judder of the lock-up clutch for if it is determined that the amplitude of vibrations received from the vehicle wheels through a suspension system is large enough to influence the determination by the judder determining means. In this judder detecting device, the judder determining means is less likely to make erroneous determination due to running of the vehicle on a bumpy road surface. However, the judder detecting device requires a vibration sensor for detecting the vibrations due to the bumpy road surface, and is accordingly complicated in construction. Further, the accuracy of determination as to whether the vibrations of the suspension or body of the vehicle will not influence the determination of the judder determining means and the accuracy of determination by the judder determining means are not necessarily satisfactory, since the detected vibrations of the vehicle suspension or body are considerably influenced by the weight and size of the vehicle body and the air pressure in the wheel tires.

SUMMARY OF THE INVENTION

It is therefore an object of the present invention to provide a slip control apparatus for a lock-up clutch of a motor vehicle, which is simple in construction and which is capable of accurately detecting an occurrence of the judder of the lock-up clutch, to control the lock-up clutch depending upon the detection of the judder.

The above object may be achieved according to a first aspect of the present invention, which provides an apparatus for controlling an amount of slip of a lock-up clutch disposed between a pump impeller and a turbine impeller in a power transmitting system of a motor vehicle, the apparatus comprising slip control means for controlling the amount of slip of the lock-up clutch such that an actual slip speed of the lock-up clutch coincides with a predetermined target slip speed, speed variation monitoring means for detecting variations of a rotating speed of the turbine impeller, and judder determining means for determining the presence or absence of a judder of the lock-up clutch on the basis of the number of the variations detected by the speed variation monitoring means during slip control of the lock-up clutch by the slip control means, the apparatus further comprising: (a) variation amplitude determining means for determining an amplitude of each of the variations of the rotating speed of the turbine impeller which have been detected by the speed variation monitoring means; and (b) amplitude change monitoring means for determining, on the basis of the amplitudes of two successive variations determined by the variation amplitude determining means, whether an amount of change of the amplitudes of the two successive variations is larger than a predetermined upper limit, and inhibiting the judder determining means from using at least a latter one of the two successive variations for the determination of the presence or absence of the judder of the lock-up clutch, if the amount of change determined is larger than the predetermined upper limit.

In the lock-up clutch control apparatus constructed according to the first aspect of the present invention described above, the amplitude of each variation of the turbine impeller speed detected by the speed variation monitoring means is determined by the variation amplitude determining means, and the amount of change of the amplitude of each detected variation from that of the preceding variation is determined by the amplitude change monitoring means. If the determined amount of change is larger than the predetermined upper limit, the judder determining means is inhibited from using the appropriate variation for the determination of the presence or absence of the judder.

The apparatus according to the first aspect of the invention is based on a finding that the amplitude of variations of the turbine impeller speed is comparatively large during an initial and a terminal portion of the period of the variations, where the variations are caused due to a relatively instantaneous passage of the vehicle through a relatively narrow local raised or recessed area of a generally good road surface. In the present apparatus, the variations are not used by the judder determining means if the amplitude change monitoring means determines that the amount of change in the amplitude of the variations is larger than the predetermined upper limit. In other words, the variations whose amplitude changes at a relatively high rate are detected by the amplitude change monitoring means, which inhibits the judder determining means from determining the presence or absence of the judder of the lock-up clutch on the basis of those variations of the turbine impeller speed which have been caused during passage of the vehicle through a local bumpy area of a generally good road surface. Thus, the present apparatus permits significantly improved accuracy of determination of an occurrence of the judder of the lock-up clutch by the judder determining means. Consequently, the present apparatus eliminates or minimizes otherwise possible interruption of the slip control of the lock-up clutch, thereby improving the fuel economy of the vehicle.

The same object may also be achieved according to a second aspect of this invention, which provides an apparatus for controlling an amount of slip of a lock-up clutch disposed between a pump impeller and a turbine impeller in a power transmitting system of a motor vehicle, the apparatus comprising slip control means for controlling the amount of slip of the lock-up clutch such that an actual slip speed of the lock-up clutch coincides with a predetermined target slip speed, speed variation monitoring means for detecting variations of a rotating speed of the turbine impeller, and judder determining means for determining the presence or absence of a judder of the lock-up clutch on the basis of the number of the variations detected by the speed variation monitoring means during slip control of the lock-up clutch by the slip control means, the apparatus further comprising: (i) variation period determining means for determining a period of each of the variations of the rotating speed of the turbine impeller which have been detected by the speed variation monitoring means; and (ii) variation period monitoring means for determining whether the period determined by the variation period determining means is outside a predetermined range, and inhibiting the judder determining means from using each of the variations whose periods are outside the predetermined range.

In the lock-up clutch control apparatus constructed according to the second aspect of the invention described above, the period of each variation detected by the speed variation monitoring means is determined by the variation period determining means. If the variation period determining means determines that the period of the variation is not held within the predetermined range, the variation period determining means inhibits the judder determining means from using that variation for the determination of the presence or absence of the judder of the lock-up clutch.

Where the variations of the turbine impeller speed are caused due to the instantaneous passage of the vehicle through the relatively narrow local raised or recessed area of the generally good road surface, as indicated above, the period or frequency of the variation waveform of the turbine impeller speed generally tends to be held within a certain range determined by the material of the friction members of the lock-up clutch and the property of the working fluid used for the lock-up clutch. In the present apparatus, however, the variations whose periods are outside the predetermined range are detected by the variation period monitoring means, and are not used by the judder determining means in determining the presence or absence of the judder of the lock-up clutch. Thus, the present apparatus eliminates or minimizes otherwise possible interruption of the slip control of the lock-up clutch, thereby improving the fuel economy of the vehicle.

According to a first preferred form of the apparatus according to the first and second aspects of this invention, the judder determining means includes: first variation number monitoring means for determining whether the number of the variations of the rotating speeds of the turbine impeller which are detected by the speed variation monitoring means during the slip control of the lock-up clutch by the slip control means is smaller than a predetermined first threshold; slip control interrupting means for interrupting the slip control of the lock-up clutch by the slip control means, if the first variation number monitoring means determines that the number of the variations detected by the speed variation monitoring means during the slip control is not smaller than the predetermined first threshold; and second variation number monitoring means for determining whether the number of the variations of the rotating speed of the turbine impeller which are detected by the speed variation monitoring means during interruption of the slip control by the slip control interrupting means is smaller than a predetermined second threshold.

In the above preferred form of the invention, the slip control of the lock-up clutch by the slip control means is interrupted by the slip control interrupting means if the first variation number monitoring means determines that the number of the variations of the turbine impeller speed during the slip control is not smaller than the predetermined first threshold valve. If the second variation number monitoring means determines that the number of the variations of the turbine impeller speed during the interruption of the slip control of the lock-up clutch is smaller than the predetermined second threshold value, this determination indicates that the variations detected during the slip control of the lock-up clutch were not caused due to a vehicle run on a poor or bumpy road surface, but occurred in the presence of a judder of the lock-up clutch. Thus, the judder of the lock-up clutch can be detected with improved accuracy.

According to one advantageous arrangement of the above preferred form of the invention, the apparatus further comprises slip control resuming means for resuming the slip control of the lock-up clutch which has been interrupted by the slip control interrupting means, if the second variation number monitoring means determines that the number of the variations of the turbine impeller speed detected by the speed variation monitoring means during the interruption of the slip control of the lock-up clutch is not smaller than the predetermined second threshold. In this respect, it is noted that if the number of the variations during the interruption of the slip control is not smaller than the second threshold, it means that the variations during the slip control of the lock-up clutch were not caused due to a judder of the lock-up clutch, but occurred due to a vehicle run on a generally poor or continuously bumpy road surface. In this case, therefore, the slip control of the lock-up clutch should desirably be resumed.

In the above advantageous arrangement, the second variation number monitoring means preferably include first monitoring means for determining whether the number of the variations of the rotating speed of the turbine impeller detected in an initial portion of the interruption of the slip control is smaller than the predetermined second threshold value, and second monitoring means for determining whether the number of the variations of the rotating speed of the turbine impeller detected in a latter portion of the interruption of the slip control which follows the initial portion is smaller than a predetermined third threshold. In this instance, the slip control resuming means is adapted to resume the slip control of the lock-up clutch if the second monitoring means determines that the number of the variations detected in the latter portion of the interruption of the slip control is smaller than the predetermined third threshold, after the first monitoring means determines that the number of the variations detected in the initial portion is not smaller than the predetermined second threshold. In this preferred arrangement, the first monitoring means is provided to determine that the variations of the turbine impeller speed during the slip control of the lock-up clutch were caused by a generally or continuously poor or bumpy road surface, and the second monitoring means is provided to determine that the road surface on which the vehicle is running is changed from the generally poor or bumpy road surface to a normal or good road surface. Since the slip control resuming means is adapted to resume the slip control of the lock-up clutch only after it is determined that the vehicle is now running on a good road surface, the resumed slip control would not be interrupted again soon after it is resumed. Thus, the present arrangement is effective to prevent repeated interruption and resumption of the slip control of the lock-up clutch during running of the vehicle on a generally poor or relatively continuously bumpy road surface. Accordingly, the present arrangement assures improved drivability of the vehicle.

In the prior art apparatus as disclosed in JP-A-4-224363 referred to above, the slip control of the lock-up clutch is interrupted and resumed repeatedly when the road surface is continuously bumpy, for example. Namely, the slip control is interrupted upon detection of excessive variations of the turbine impeller speed due to the bumpy road surface. Since the road surface is continuously bumpy, the variations during the interruption of the slip control continue to be excessive, and the slip control is resumed because the excessive variations during the interruption indicate the absence of a judder of the lock-up clutch. Thus, the slip control is repeatedly interrupted and resumed, and the vehicle drivability is deteriorated according to the prior art control apparatus.

In a second preferred advantageous arrangement of the above preferred form of the invention wherein the judder determining means includes the slip control interrupting means and the second variation number monitoring means, the apparatus further comprises slip control terminating means for terminating the slip control of the lock-up clutch if the second variation number monitoring means determines that the number of the variations of the rotating speed of the turbine impeller detected by the speed variation monitoring means during the interruption of the slip control is smaller than the predetermined second threshold. If the number of the variations of the turbine impeller speed is smaller than the second threshold during the interruption of the slip control of the lock-up clutch, it means that the variations detected during the preceding slip control were caused by a judder of the lock-up clutch, and the slip control of the lock-up clutch should not be resumed and should be terminated, namely, should be inhibited until the cause for the judder is removed, that is, until the deteriorated condition of the friction members of the lock-up clutch is restored to the normal condition. For example, the slip control is inhibited until the engine is stopped and re-started.

The object indicated above may also be achieved according to a third aspect of the present invention, which provides an apparatus for controlling an amount of slip of a lock-up clutch disposed between a pump impeller and a turbine impeller of a fluid-filled power transmitting device which is disposed between an engine and an automatic transmission of a motor vehicle such that an output torque of the engine is transmitted to the automatic transmission through the power transmitting device, the automatic transmission having an output shaft operatively connected to a drive wheel of the vehicle, the apparatus comprising slip control means for controlling the amount of slip of the lock-up clutch such that an actual slip speed of the lock-up clutch coincides with a predetermined target slip speed, the apparatus further comprising: (a) turbine speed variation amplitude monitoring means for determining a variation amplitude of a rotating speed of the turbine impeller; (b) output speed variation amplitude monitoring means for determining a variation amplitude of a rotating speed of the output shaft of the automatic transmission; (c) speed ratio determining means for determining a speed ratio of the automatic transmission; and (d) judder determining means for determining the presence or absence of a judder of the lock-up clutch on the basis of the variation amplitude of the rotating speed of the turbine impeller as compared with a product of the variation amplitude of the rotating speed of the output speed and the actual speed ratio of the automatic transmission.

In the lock-up clutch slip control apparatus according to the third aspect of the invention described above, the speed variation amplitudes of the turbine impeller and the output shaft of the automatic transmission are determined by the turbine speed variation amplitude monitoring means and the output speed variation amplitude monitoring means, respectively. Further, the actual speed ratio of the transmission is determined by the speed ratio determining means. On the basis of the speed variation amplitude of the turbine speed as compared with the the product of the speed variation amplitude of the transmission output shaft and the transmission speed ratio, the judder determining means determines whether the lock-up clutch is juddering.

Thus, the present lock-up clutch slip control apparatus does not require a sensor for detecting or monitoring vibrations of a suspension system or a body of the vehicle, since the present apparatus may utilize speed sensors which are usually provided to control shifting actions of the automatic transmission. Accordingly, the apparatus according to the present third aspect of the invention is simplified in construction. Further, the present apparatus does not use or monitor the vibrations which are received from the road surface through the suspension system, but uses the speed variation amplitude values of the turbine impeller and transmission output shaft. This arrangement permits significantly improved accuracy of determination by the judder determining means, without an influence of the weight and size of the vehicle body and the air pressures of the wheel tires.

In one preferred form of the invention according to the third aspect of this invention, the judder determining means determines that the lock-up clutch is juddering, if the variation amplitude of the rotating speed of the turbine impeller is larger than the product. In an another preferred form, the judder determining means determines that the lock-up clutch is juddering, if the variation amplitude of the rotating speed of the turbine impeller is larger than a sum of the product and a predetermined constant. In a further preferred form, the judder determining means determines that the lock-up clutch is juddering, if a ratio of the variation amplitude of the rotating speed of the turbine impeller to the variation amplitude of the rotating speed of the output shaft is larger than the speed ratio.

The object indicated above may also be achieved according to a fourth aspect of this invention, which provides an apparatus for controlling an amount of slip of a lock-up clutch disposed between a pump impeller and a turbine impeller of a fluid-filled power transmitting device which is disposed between an engine and an automatic transmission of a motor vehicle such that an output torque of the engine is transmitted to the automatic transmission through the power transmitting device, the automatic transmission having an output shaft operatively connected to a drive wheel of the vehicle, the apparatus comprising slip control means for controlling the amount of slip of the lock-up clutch such that an actual slip speed of the lock-up clutch coincides with a predetermined target slip speed, the apparatus further comprising: (i) a turbine speed sensor for detecting a rotating speed of the turbine impeller; (ii) an output speed sensor for detecting a rotating speed of the output shaft of the automatic transmission; (iii) phase difference determining means for determining a phase difference between a variation waveform of the rotating speed of the turbine impeller and a variation waveform of the rotating speed of the output shaft; and (iv) judder determining means for determining the presence or absence of a judder of the lock-up clutch on the basis of the phase difference determined by the phase difference determining means, as compared with a predetermined reference value.

In the lock-up clutch slip control apparatus according to the fourth aspect of the present invention, the phase difference determining means is adapted to determine the phase difference between a variation waveform of the turbine impeller speed detected by the turbine speed sensor and a variation waveform of the output shaft speed of the transmission detected by the output speed sensor. On the basis of this phase difference as compared with the predetermined reference value, the judder determining means determines whether the lock-up clutch is juddering.

Like the apparatus according to the third aspect of this invention, the present lock-up clutch slip control apparatus does not require a sensor for detecting or monitoring vibrations of a suspension system or a body of the vehicle, since the present apparatus may utilize speed sensors which are usually provided to control shifting actions of the automatic transmission. Accordingly, the apparatus according to the present fourth aspect of the invention is simplified in construction. Further, the present apparatus does not use or monitor the vibrations which are received from the road surface through the suspension system, but uses the speed variations of the turbine impeller and transmission output shaft. This arrangement permits significantly improved accuracy of determination by the judder determining means, without an influence of the weight and size of the vehicle body and the air pressures of the wheel tires.

In one preferred form of the present apparatus, the judder determining means determines that the lock-up clutch is juddering, if a phase of the variation waveform of the rotating speed of the output shaft is advanced with respect to a phase of the variation waveform of the rotating speed of the turbine impeller by more than the predetermined reference value.

In the above third and fourth aspects of the present invention, the apparatus may further comprise slip control terminating means for terminating slip control of the lock-up clutch by the slip control means if the judder determining means determines that the lock-up clutch is juddering. Preferably, the slip control terminating means is adapted to inhibit resuming the slip control until the deteriorated friction condition of the lock-up clutch which has caused the judder is restored to the normal condition, for example, until the engine is re-started after it is turned off.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 2 is a table indicating a relationship between the operating positions of an automatic transmission connected to the torque converter and the respective combinations of the operating states of first and second solenoid-operated valves of the slip control apparatus;

DETAILED DESCRIPTION OF THE PREFERRED EMBODIMENT

Figure 1:
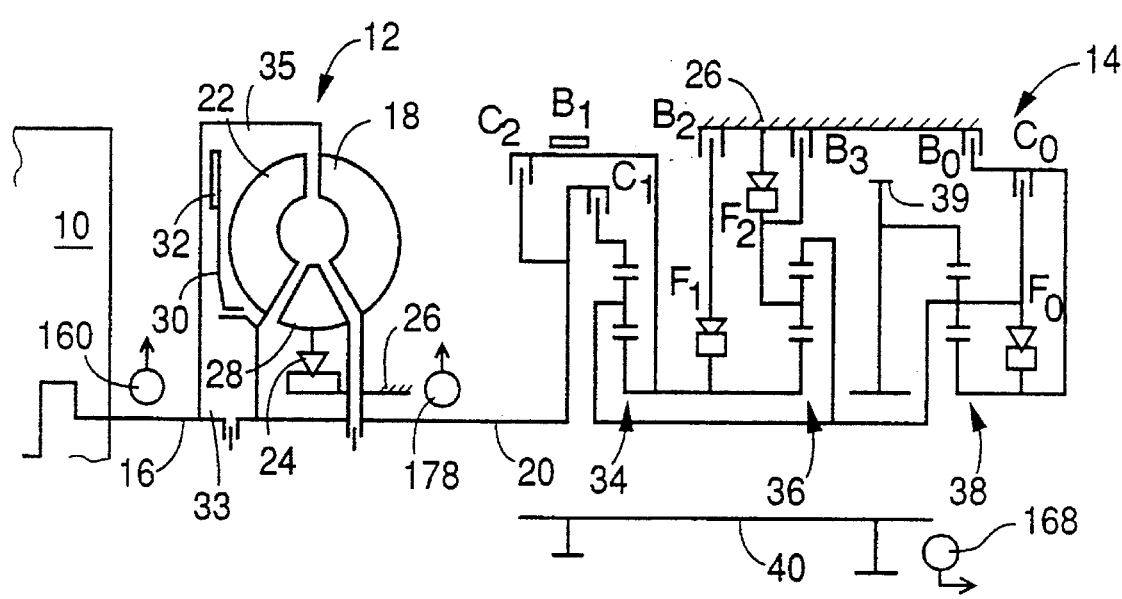
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 30 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1 B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), 3rd-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st", "2nd", "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
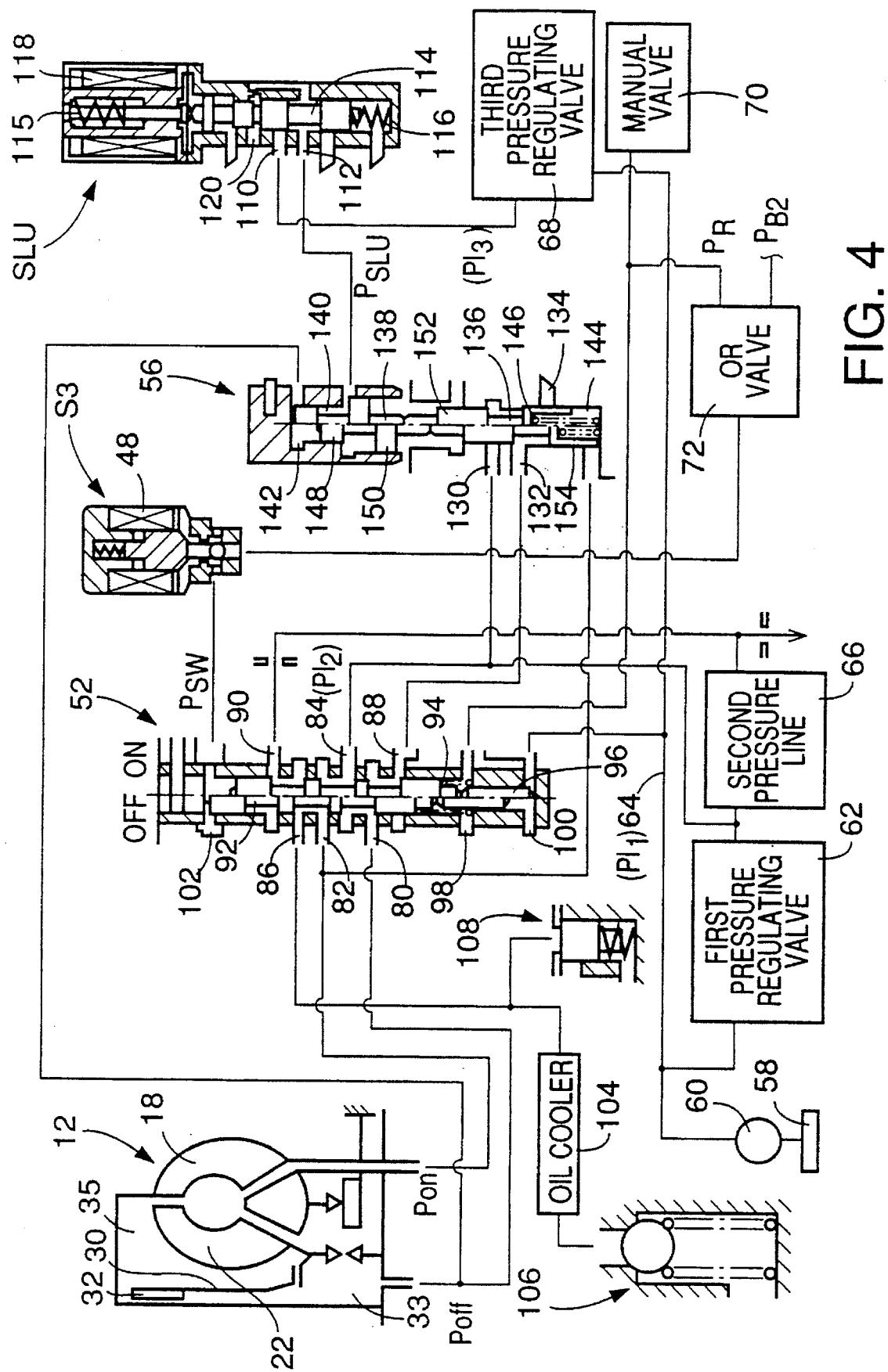
FIG. 4 is a view illustrating a part of a hydraulic control device shown in FIG. 3, which incorporates a circuit for controlling the lock-up clutch.
Figure 5:
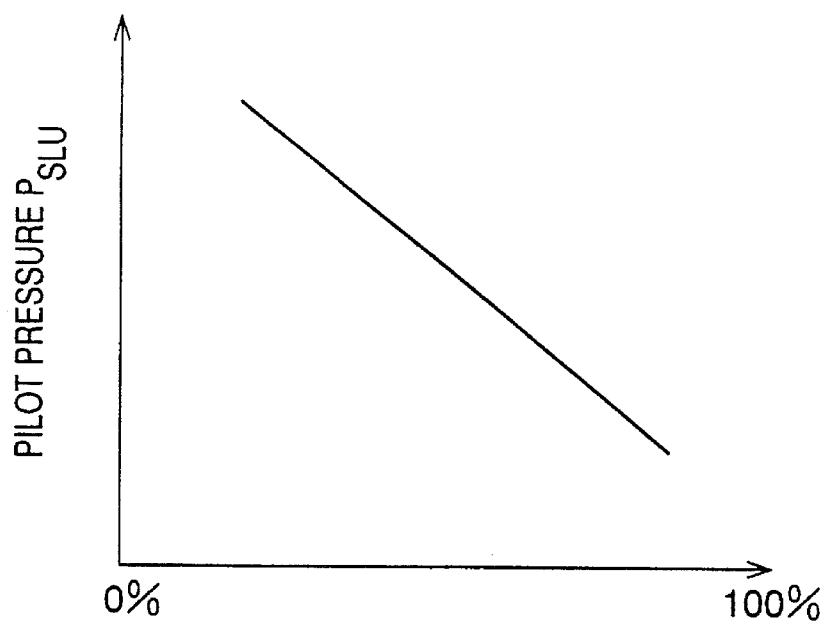
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference ΔP between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening θ1 of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$ against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force larger than that of the spring 115; a solenoid coil 118 for biasing the spool 114 in the valve closing direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference $\Delta P$ (=Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference $\Delta P$.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference $\Delta P$ (=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference $\Delta P$ changes with the pilot pressure $P_{SLU}$ as shown in FIG. 6, at a rate or gradient represented by a value (A2−A1)/A1 included in the following equation (1):

$$\Delta P = Pon - Poff = [(A2-A1)/A1]P_{SLU} - Fs/A1 \qquad (1)$$

where, Fs: biasing force of the spring 146.

Figure 6:
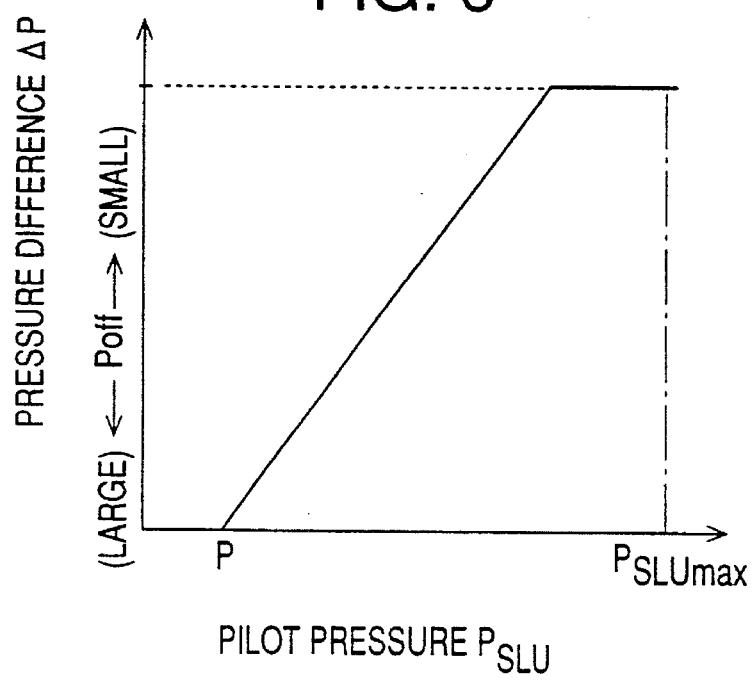
FIG. 6 is a graph indicating an output characteristic of a lock-up clutch control valve provided in the lock-up clutch control circuit of FIG. 4, namely, a relationship between a pilot pressure PSLU received by the lock-up clutch control valve and a pressure difference ΔP of engaging and releasing oil chambers of the lock-up clutch.

The graph of FIG. 6 indicates the output characteristic of the lock-up clutch control valve 56, namely, the relationship between the pressure difference $\Delta P$ generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference $\Delta P$ of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$. The slip speed $N_{SLP}$ is a difference ($N_P - N_T$) between a speed $N_P$ of the pump impeller 8 (speed $N_E$ of the engine 10)

and a speed $N_T$ of the turbine impeller 22 (speed $N_{IN}$ of the input shaft 20).

Figure 3:
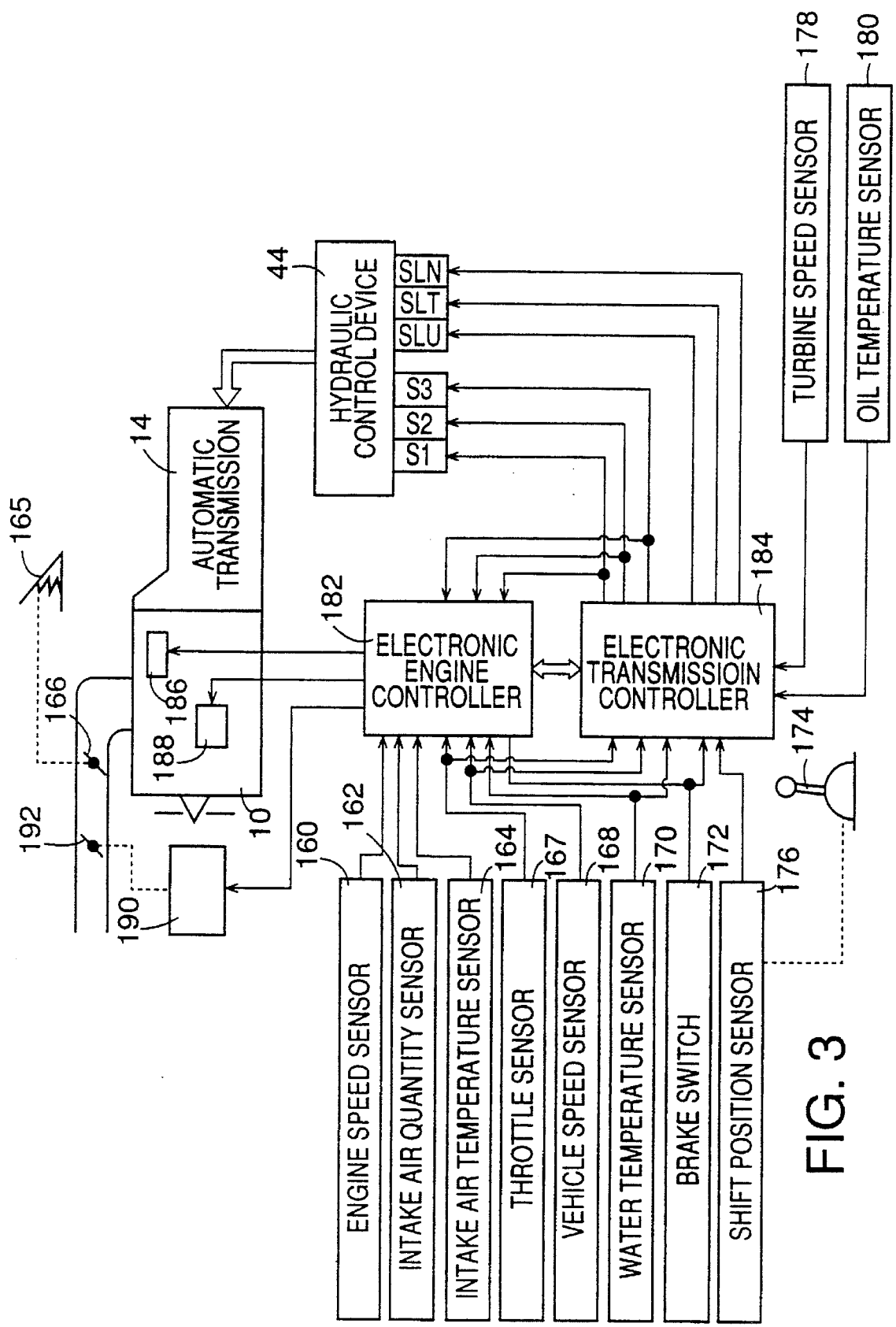
FIG. 3 is a block diagram showing a control system for the motor vehicle, which includes a transmission controller incorporating the slip control apparatus for the lock-up clutch.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening θ1 of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed $N_{OUT}$ of the output shaft 40 of the automatic transmission 14; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 14, namely, a currently selected one of the operating positions "L", "S", "D", "N", "R" and "P" of the shift lever 174; a turbine speed sensor 178 for detecting the speed $N_T$ of the turbine impeller 22, that is, the speed $N_{IN}$ of the input shaft 20 of the transmission 14; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening θ1 and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
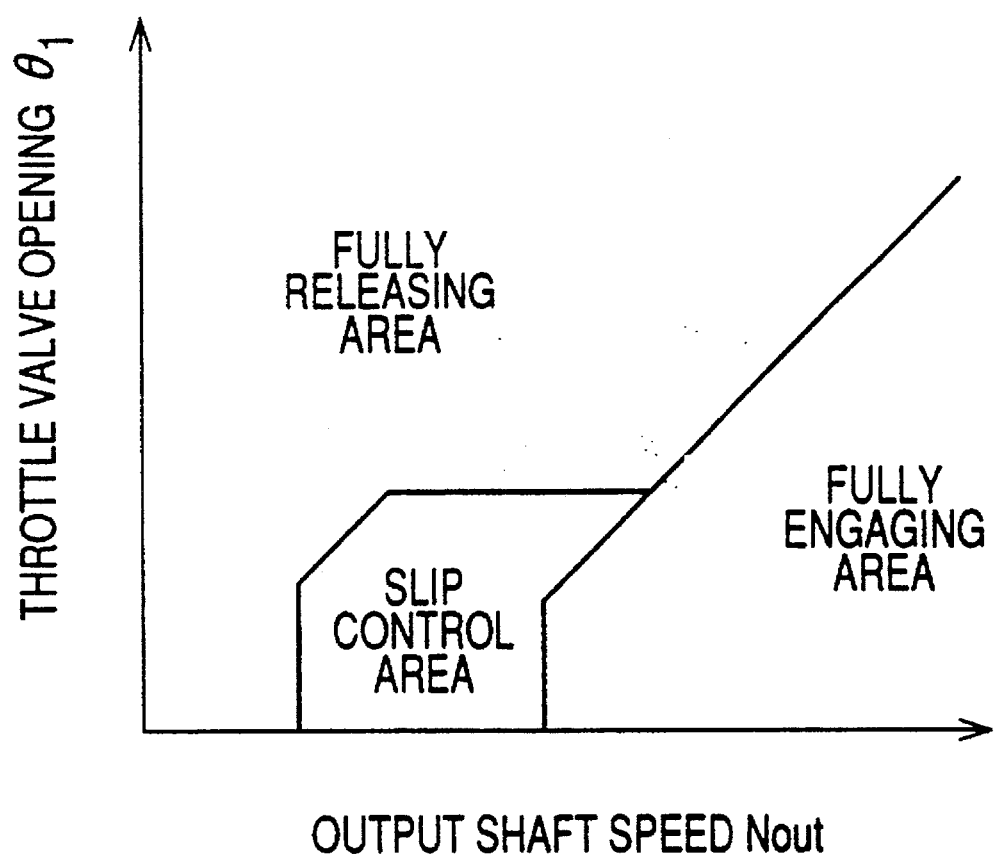
FIG. 7 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 7 are stored in the ROM. For instance, the boundaries are relationships between the throttle valve opening θ1 and the output speed $N_{OUT}$ of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening θ1 and output speed $N_{OUT}$, one of the three control areas is determined or selected by the CPU of the transmission controller 184, according to the boundaries stored in the ROM.

When the vehicle running condition (θ1 and $N_{OUT}$) is in the slip control area, the lock-up clutch 32 is controlled to be held in a partially slipping state for transmitting power of the engine 10 to the automatic transmission 14 so as to maximize the fuel economy of the vehicle while absorbing a torque variation of the engine 10 to assure high drivability of the vehicle. The determination as to whether the vehicle running condition falls in the slip control area according to the boundaries of FIG. 7 stored in the ROM is effected while the vehicle is accelerating. In this respect, it is noted that the amount of slip of the lock-up clutch 32 is also controlled while the vehicle is coasting or decelerating with the throttle valve 166 placed in the idling position. This slip control is effected to increase an effect of the fuel-cut control of the engine 10. In this case, however, the slip control area is determined on the basis of only the vehicle speed V, since the throttle opening θ1 is zero during the coasting of the vehicle.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU, that is, the duty ratio $D_{SLU}$ of the valve SLU is adjusted according to the following equation (2) to control the amount of slip of the lock-up clutch 32 in a slip control mode:

$$D_{SLU} (=I_{SLU}) = DFWD + KGD + DFB \qquad (2)$$

For instance, the duty ratio $D_{SLU}$ (%) (=SLIP CONTROL current $I_{SLU}$) is calculated to zero an error ΔE (=$N_{SLP}$−$TN_{SLP}$) between a target slip speed $TN_{SLP}$ and the actual slip speed $N_{SLP}$ (=$N_E$−$N_T$) of the lock-up clutch 32. The first term DFWD of the right member of the above equation (2) is the feed forward control value which corresponds the output of the engine 10 such as the output torque. The second term KGD is a learning control value which changes so as to reflect the varying characteristics of the lock-up clutch 32. The third term DFB is a feedback control value which is a sum of a proportional value, a differential value and an integral value of the error ΔE, as indicated in the following equation (3):

$$DFB=K_P[\Delta E+(1/T1)\int \Delta E dt+T_D(d\Delta E/dt)] \quad (3)$$

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting a fuel injection control for controlling a fuel injection valve 186 so as to optimize the combustion condition of the engine 10, an ignition control for controlling an ignitor 188 so as to optimize the ignition timing, a traction control for controlling a second throttle valve 192 via a throttle actuator 190 so as to control the traction force of the vehicle while preventing slipping of the drive wheels on the road surface, and a fuel-cut control for holding the fuel injection valve 186 closed while the engine speed $N_E$ is higher than a predetermined fuel-cut threshold level $N_{CUT}$ during coasting of the vehicle, so that the fuel economy of the vehicle is improved.

Figure 8:
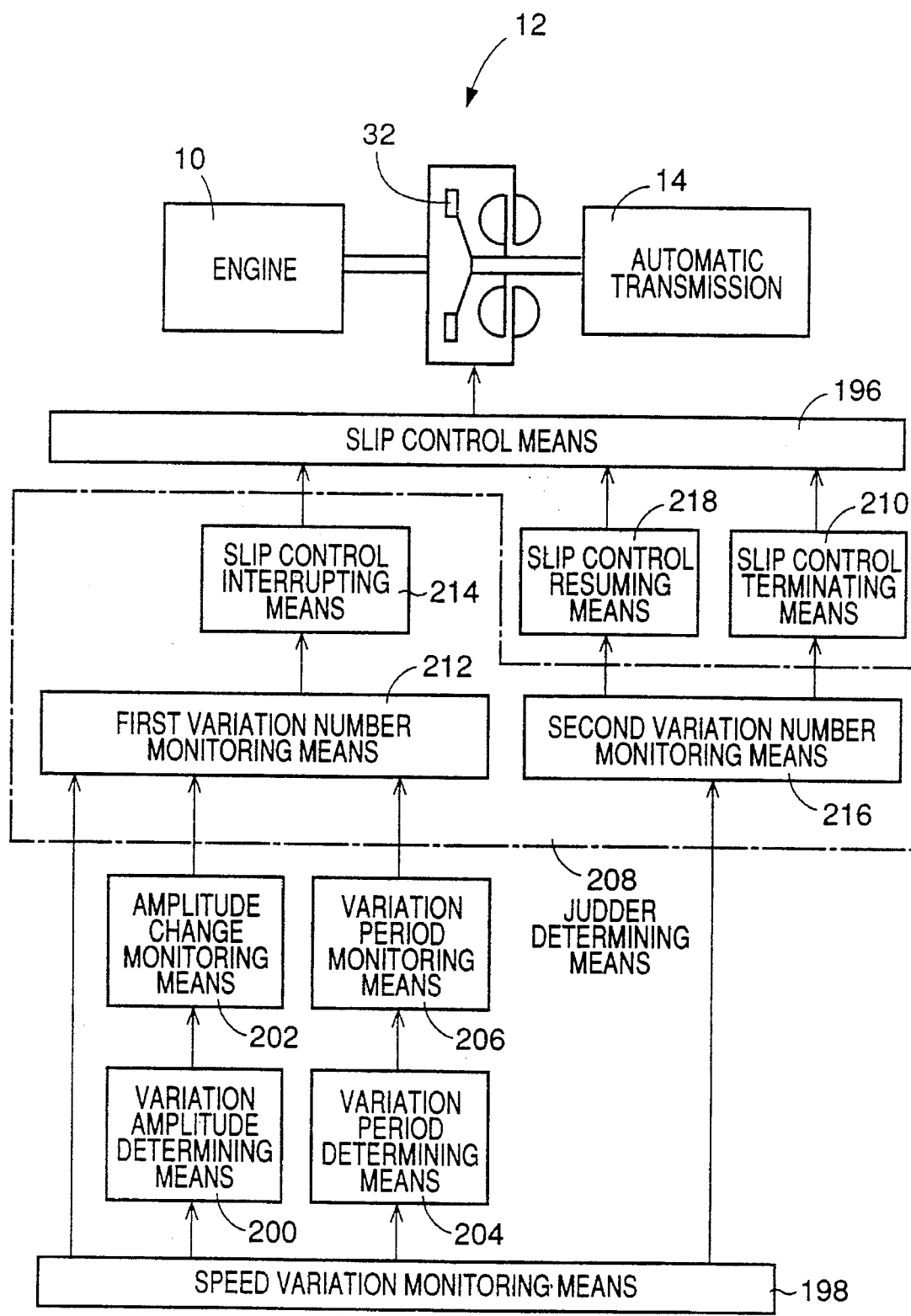
FIG. 8 is a block diagram illustrating the functions of various functional means incorporated in the slip control apparatus according to the first embodiment of the invention.

Referring next to the block diagram of FIG. 8, there will be described the functions of various functional means provided in the electronic transmission controller 184. That is, the transmission controller 184 incorporates slip control means 196, speed variation monitoring means 198, variation amplitude determining means 200, amplitude change monitoring means 202, variation period determining means 204, variation period monitoring means 206, judder determining means 208, slip control terminating means 210 and slip control resuming means 218. The judder determining means 208 includes first variation number monitoring means 212, slip control interrupting means 214 and second variation number monitoring means 216.

When the slip control means 196 determines that the vehicle running condition is in the slip control area explained above by reference to FIG. 7 or that the vehicle is in deceleration, the slip control means 196 applies the SLIP CONTROL current $I_{SLU}$ to the linear solenoid valve SLU for operating the valve SLU at the duty ratio $D_{SLU}$ calculated according to the above equation (2), so that the detected slip speed $N_{SLP}$ coincides with the target slip speed $TN_{SLP}$. The speed variation monitoring means 198 is adapted to detect a variation or pulsation of the rotating speed $N_T$ of the turbine impeller 22. The variation amplitude determining means 200 is adapted to determine an amplitude DNTJ of the variation of the turbine impeller speed $N_T$. The amplitude change monitoring means 202 is adapted to determine whether an amount of change $|DNTJ_{i-1}-DNTJ_i|$ of the variation amplitude DNTJ of the turbine impeller speed $N_T$ is larger than an upper limit tKDNTJS. The amount of change $|DNTJ_{i-1}-DNTJ_i|$ is a difference between the variation amplitude values $DNTJ_{i-}$ and $DNTJ_i$ detected in two successive control cycles, namely, the last detected value $DNTJ_i$ and the value $DNTJ_{i-}$ which precedes the last detected value $DNTJ_i$. The variation period determining means 204 is adapted to determine a period of the variation waveform of the turbine impeller speed $N_T$. In the illustrated embodiment, the period is determined by detecting a half value DTJ of the period of variation of the speed $N_T$, as described below. The variation period monitoring means 206 is adapted to determine whether the period of variation of the turbine impeller speed $N_T$ is held within a predetermined range. In the illustrated embodiment, the variation period monitoring means 206 determines whether the half period DTJ is held within a range between predetermined lower and upper limits tKDTJA and tKDTJB.

The judder determining means 208 is adapted to determine whether the lock-up clutch 32 under slip control by the slip control means 196 is suffering from a "judder". This determination is made on the basis of the variations of the turbine impeller speed $N_T$ during the slip control of the lock-up clutch 32 and during interruption of the slip control. When the judder of the lock-up clutch 32 is detected by the judder determining means during the interruption of the slip control, the slip control terminating means 210 inhibits the slip control means 196 from resuming the slip control of the lock-up clutch 32, that is, finally terminate the slip control of the lock-up clutch 32 by the slip control means 196 after the slip control is once interrupted. Thus, the slip control means 196 is kept disabled upon detection of a judder of the lock-up clutch 32, by the time the deteriorated friction condition of the lock-up clutch 32 is expected to be restored to the normal condition, for example, until the engine is stopped and re-started.

In the event that the amplitude change monitoring means 202 determines that the amount of change $|DNTJ_{i-1}-DNTJ_i|$ of the variation amplitude of the speed $N_T$ is larger than the upper limit tKDNTJS, the amplitude change monitoring means 202 inhibits the judder determining means 208 from using the variation of the speed $N_T$ in question for the determination of the judder of the lock-up clutch 32. Similarly, in the event that the variation period monitoring means 206 determines that the determined variation period of the speed $N_T$ is outside the predetermined range, the variation period monitoring means 206 inhibits the judder determining means 208 from using the variation in question for the determination of the judder. Thus, the amplitude change monitoring means 202 and the variation period monitoring means 206 function to exclude the judder determining means 208 from using those variations of the turbine impeller speed $N_T$ which tend to occur while the vehicle is passing through a relatively narrow local raised or recessed area of a generally good road surface, whereby the accuracy of determination by the judder determining means 208 of an occurrence of the judder of the lock-up clutch 32 is improved.

As indicated above, the judder determining means 208 includes the first variation number monitoring means 212, slip control interrupting means 214 and second variation number monitoring means 216. The first variation number monitoring means 212 is adapted to determine whether the number of variations of the turbine impeller speed $N_T$ detected by the speed variation monitoring means 198 during the slip control of the lock-up clutch 32 exceeds a first predetermined threshold. If the first variation number monitoring means 212 determines that this number exceeds the first threshold, the slip control interrupting means 214 commands the slip control means 196 to interrupt the slip control of the lock-up clutch 32. The second variation number monitoring means 216 is adapted to determine whether the number of variations of the turbine impeller speed $N_T$ during the interruption of the slip control of the lock-up clutch 32 exceeds a predetermined second threshold. If the second variation number monitoring means 216 determines that this number does not exceed the second threshold, it indicates that the variations detected during the slip control of the lock-up clutch 32 occurred due to an occurrence or presence of a judder of the lock-up clutch 32. Thus, the judder determining means 208 is capable of detecting the judder of the lock-up clutch 32 with improved accuracy. In this case, the slip control terminating means 210 inhibits the slip control means 196 from resuming the slip control of the lock-up clutch 32, that is, finally terminates the slip control.

If the second variation number monitoring means 216 determines that the number of the variations of the turbine impeller speed $N_T$ exceeds the predetermined second threshold, it indicates that the variations detected during the slip control of the lock-up clutch 32 did not occur due to a judder of the lock-up clutch 32, but occurred due to a vehicle run on a generally poor road surface such as a continuously bumpy road surface. In this case, the slip control resuming means 218 commands the slip control means 196 to resume, at a suitable point of time, the slip control of the lock-up clutch 32 which has been interrupted by the slip control interrupting means. For example, the slip control is resumed only after a good road surface condition is detected. This arrangement is effective to prevent repeated interruption and resumption of the slip control of the lock-up clutch 32.

Figure 9:
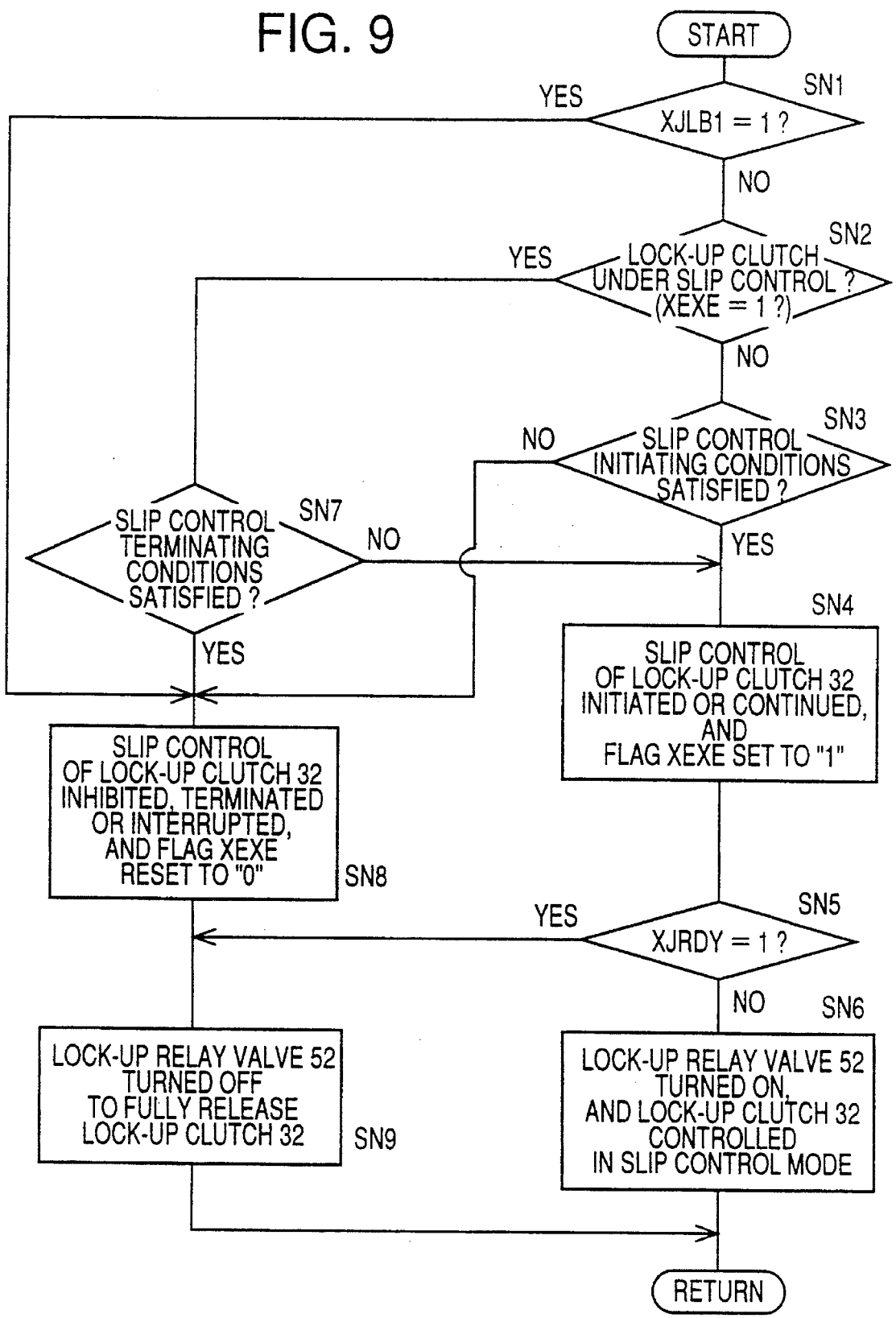
FIG. 9 is a flow chart schematically illustrating a slip control routine executed by the slip control apparatus.
Figure 10:
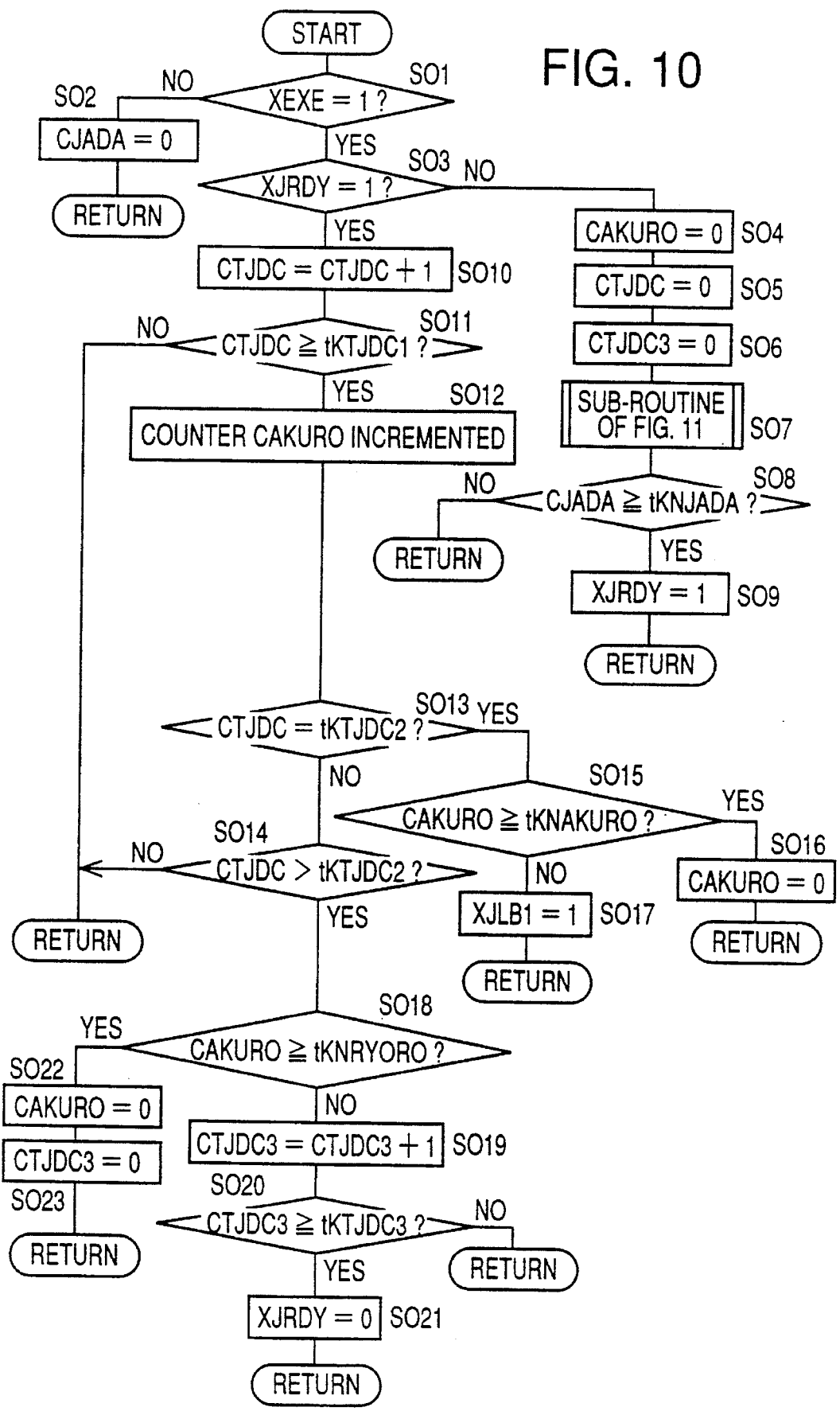
FIG. 10 is a flow chart illustrating a flag setting routine also executed by the slip control apparatus.

The functions of the various functional means indicated above will be better understood by reading the following description of the operation of the transmission controller 184 by reference to the flow charts of FIGS. 9 and 10, which illustrate a slip control routine and a flag setting routine, respectively. These routines are repeatedly executed either in parallel or in sequence.

The slip control routine of FIG. 9 is initiated with step SN1 to determine whether a SLIP CONTROL INHIBIT flag XJLB1 is set at "1". This flag XJLB1 when it is set at "1" indicates the presence or occurrence of a judder of the lock-up clutch 32 due to deterioration of the working oil or poor friction surface condition thereof. The presence of the judder indicates that the slip control of the lock-up clutch 32 is not effected in the correct way. The SLIP CONTROL INHIBIT flag XJLB1 is reset to "0" each time an ignition key of the vehicle is turned on.

If an affirmative decision (YES) is obtained in step SN1, the control flow goes to step SN8 in which the slip control of the lock-up clutch 32 is interrupted, and a SLIP CONTROL flag XEXE is reset to "0". This flag XEXE when it is set at "1" indicates that the lock-up clutch 32 is controlled in the slip control mode. Step SN8 is followed by step SN9 in which the lock-up relay valve 52 is turned off to place the lock-up clutch 32 in the fully released state. If a negative decision (NO) is obtained in step SN1, on the other hand, the control flow goes to step SN2 to determine whether the lock-up clutch 32 is currently controlled in the slip control mode. This determination is effected on the basis of the content of the SLIP CONTROL flag XEXE. That is, step SN2 is provided to determine whether the SLIP CONTROL flag XEXE is set at "1".

Initially, a negative decision (NO) is obtained in step SN2, and the control flow goes to step SN3 to determine whether predetermined conditions required for initiating the slip control of the lock-up clutch 32 are satisfied. These slip control initiating conditions include a condition that the vehicle running condition is in the slip control area indicated in FIG. 7 or the vehicle is in deceleration, and a condition that the rate of change of the throttle opening θ1 is smaller than a predetermined threshold. If a negative decision (NO) is obtained in step SN3, steps SN8 and SN9 are implemented to inhibit the initiation of the slip control of the lock-up clutch 32. If an affirmative decision (YES) is obtained in step SN3, the control flow goes to step SN4 corresponding to the slip control means 196, in which the SLIP CONTROL flag XEXE is set to "1" and the slip control of the lock-up clutch 32 is initiated. More specifically described, the duty ratio $D_{SLU}$ of the linear solenoid valve SLU is calculated according to the above equation (2) so as to zero the control error $\Delta E$, and the SLIP CONTROL current $I_{SLU}$ corresponding to the calculated duty ratio $D_{SLU}$ is applied to the solenoid coil 118 of the valve SLU.

Step SN4 is followed by step SN5 to determine whether a PROVISIONAL JUDDER DETERMINATION flag XJRDY is set at "1". If a negative decision (NO) is obtained in step SN5, the control flow goes to step SN6 to turn on the lock-up relay valve 52 so that the lock-up clutch 32 is controlled in the slip control mode according to the duty ratio $D_{SLU}$. If an affirmative decision (YES) is obtained in step SN5, the control flow goes to step SN9 to turn off the lock-up relay valve 52 and bring the lock-up clutch 32 to the fully released state irrespective of the duty ratio $D_{SLU}$, for thereby interrupting the slip control of the lock-up clutch 32.

If the SLIP CONTROL flag XEXE is once set to "1", an affirmative decision (YES) is obtained in step SN2. In this case, step SN7 is implemented to determine whether conditions required for terminating the slip control of the lock-up clutch 32 are satisfied. The slip control terminating conditions include a condition that the vehicle running condition is not in the slip control area of FIG. 7 or not in deceleration, and a condition that the rate of change of the throttle opening θ1 is larger than a predetermined threshold. If a negative decision (NO) is obtained in step SN7, the control flow goes to step SN4 to continue the slip control of the lock-up clutch 32. If an affirmative decision (YES) is obtained in step SN7, steps SN8 and SN9 are implemented to terminate the slip control of the lock-up clutch 32.

It will be understood that step SN8 is implemented to: inhibit the slip control means 196 from initiating the slip control of the lock-up clutch 32 if the negative decision (NO) is obtained in step SN3; terminate the slip control if the affirmative decision is obtained in step SN7; or inhibit the slip control means 196 from resuming the slip control if the affirmative decision is obtained in step SN1 with the PROVISIONAL JUDDER DETERMINATION flag XJRDY set at "1". It will also be understood that step SN9 is implemented to interrupt the slip control if an affirmative decision is obtained in step SN5.

The flag setting routine of FIG. 10 is initiated with step SO1 to determine whether the SLIP CONTROL flag XEXE is set at "1". If the lock-up clutch 32 is not controlled in the slip control mode by the slip control means 196, a negative decision (NO) is obtained in step SO1. In this case, the control flow goes to step SO2 to reset a JUDDER DETERMINATION counter CJADA to "0", and one cycle of execution of the routine of FIG. 10 is terminated. If the lock-up clutch 32 is controlled in the slip control mode, an affirmative decision (YES) is obtained in step SO1, and the control flow goes to step SO3 to determine whether the PROVISIONAL JUDDER DETERMINATION flag XJRDY is set at "1".

If a negative decision (NO) is obtained in step SO3, the control flow goes to steps SO4, SO5 and SO6 to reset a POOR ROAD SURFACE DETERMINATION counter CAKURO, a timer CTJDC and A GOOD ROAD SURFACE DETERMINATION timer CTJDC3 to "0". Step SO6 is followed by step SO7 to execute a sub-routine as illustrated in the flow chart of FIG. 11, in which the JUDDER DETERMINATION counter CJADA is incremented if predetermined conditions are satisfied. This counter CJADA is reset or cleared at a predetermined time interval, and is adapted to count the number of upper and lower peaks, within that time interval, of the waveform of the rotating speed $N_T$ of the turbine impeller 22, which peaks satisfy predetermined conditions, as described below. In practice, two more counters CJADA are used to count the numbers of such peaks within different time periods which correspond to the predetermined time interval and which are shifted from each other by a suitable time length. These counters CJADA are operated in parallel. For easy understanding, the following description refers to one of the counters CJADA.

Figure 11:
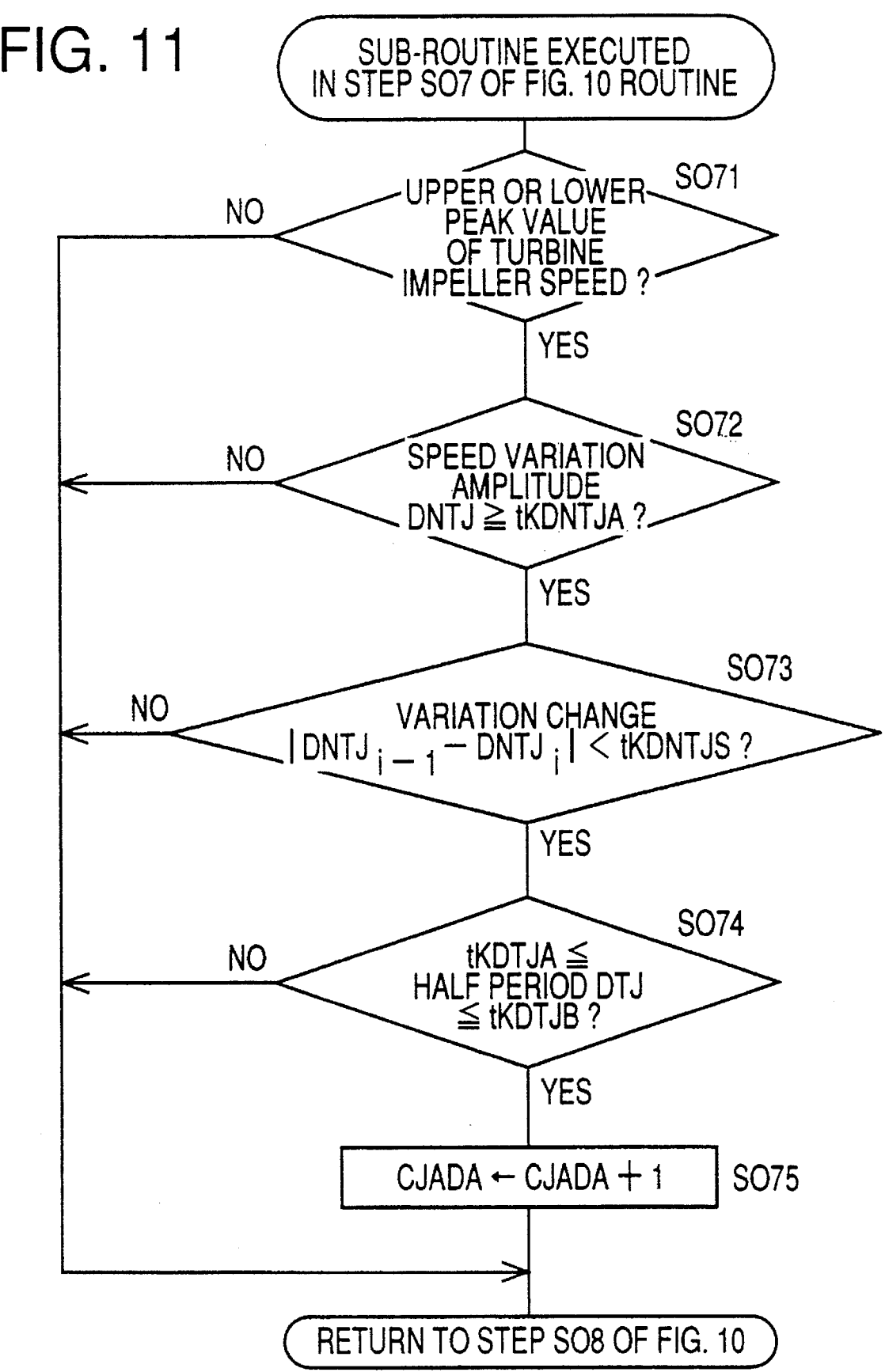
FIG. 11 is a flow chart illustrating a sub-routine executed in the flag setting routine of FIG. 10, according to the first embodiment of the invention.
Figure 12:
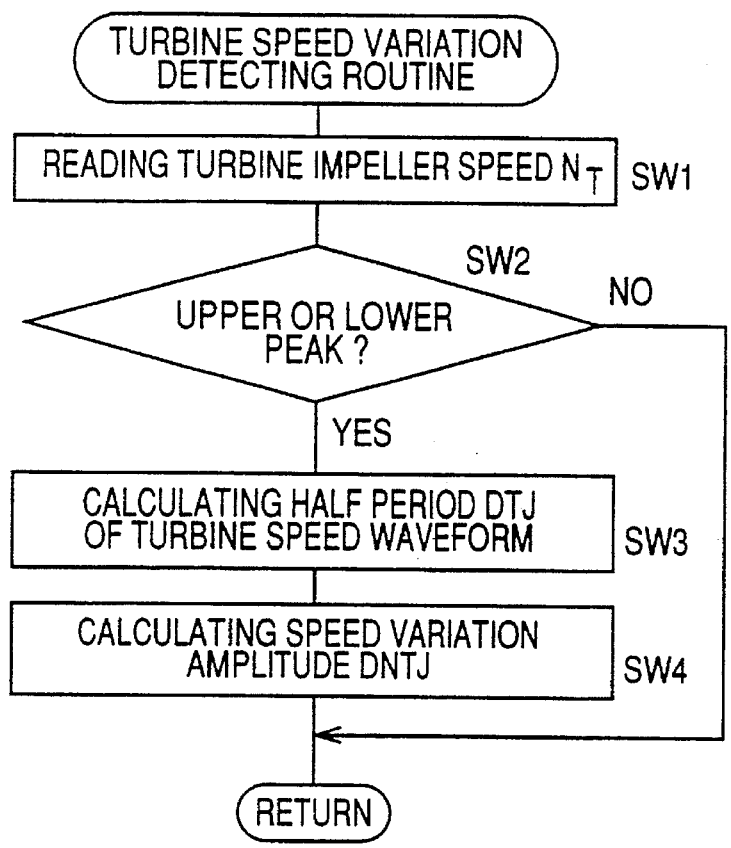
FIG. 12 is a flow chart illustrating an interruption routine executed by the slip control apparatus to calculate upper and lower peak values of a waveform of the rotating speed $N_T$ of a turbine impeller of the torque converter, a variation amplitude of the rotating speed, and a half value of the period of the waveform.
Figure 13:
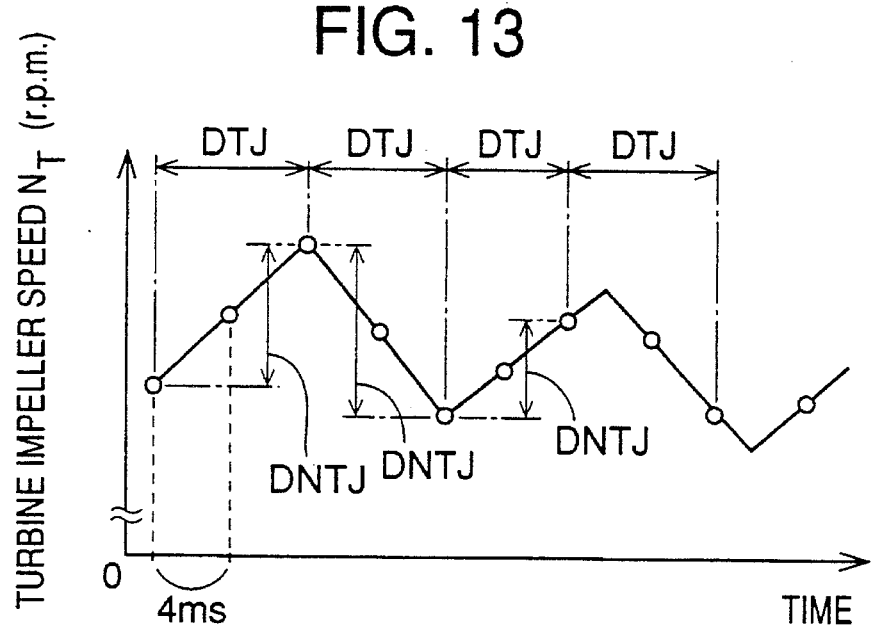
FIG. 13 is a time chart indicating the waveform of the rotating speed of the turbine impeller which is analyzed in the interruption routine of FIG. 12.

To permit the sub-routine of FIG. 11 to be executed, an interruption routine as illustrated in the flow chart of FIG. 12 is executed with a predetermined cycle time, for example, about 4 ms. This interruption routine is adapted to obtain a half period DTJ of the waveform of the turbine impeller speed $N_T$, and a variation amplitude DNTJ of the turbine impeller speed $N_T$, which parameters DTJ and DNTJ are used in the sub-routine of FIG. 11 to determine whether the JUDDER DETERMINATION counter CJADA should be incremented or not. Described in detail, the interruption routine is initiated with step SW1 to read the speed $N_T$ of the turbine impeller 22 detected by the turbine speed sensor 178. The values of the speed $N_T$ which are read by the transmission controller 184 are indicated by white dots in the graph of FIG. 13. Then, the control flow goes to step SW2 to determine whether the value of the speed $N_T$ preceding the value which has been read in step SW1 is an upper or lower peak (maximal or minimal point) of the waveform of the speed $N_T$. This determination is made according to a peak determining algorithm well known in the art. If a negative decision (NO) is obtained in step SW2, one cycle of execution of the present interruption routine is terminated. If an affirmative decision (YES) is obtained in step SW2, the control flow goes to step SW3 to calculate a length of time DTJ between the two adjacent upper and lower peaks (between the peak determined in step SW2 in the present cycle and the preceding peak). This period DTJ is equal to a half of the period of the variation waveform of the turbine impeller speed $N_T$. Step SW3 is followed by step SW4 to calculate an amplitude DNTJ of a variation of the speed $N_T$ during the calculated half period DTJ. The variation amplitude DNTJ is a difference between the adjacent upper and lower peaks of the waveform of the speed $N_T$. Thus, the interruption routine of FIG. 12 is executed with the predetermined cycle time (e.g., 4 ms) to calculate the half period DTJ and the variation amplitude DNTJ.

It will be understood that steps SW2, SW3 and SW4 correspond to the speed variation monitoring means 198, variation period determining means 204 and variation amplitude determining means 200, respectively.

Referring back to the sub-routine of FIG. 11, the JUDDER DETERMINATION counter CJADA is incremented if an upper or lower peak of the variation waveform of the turbine impeller speed $N_T$ which is detected in step SO71 satisfies all of three predetermined conditions corresponding to steps SO72, S073 and S074. Described more particularly, the sub-routine of FIG. 11 is initiated with step SO71 to determine whether any upper or lower peak of the variation waveform of the turbine impeller speed $N_T$ has been detected in the interruption routine of FIG. 12. If a negative decision (NO) is obtained in step S071, one cycle of execution of the present routine of FIG. 11 is terminated. If an affirmative decision (YES) is obtained in step SO71, the control flow goes to step SO72 to determine whether the variation amplitude DNTJ of the speed $N_T$ during the last calculated half period DTJ is equal to or larger than a predetermined lower limit tKDNTJA. This lower limit tKDNTJA is determined by experimentation to assure accurate detection of a variation of the speed $N_T$ which is characteristic of a judder of the lock-up clutch 32. Namely, if the variation amplitude DNTJ is smaller than the lower limit tKDNTJA, the variation is not considered to represent a judder of the lock-up clutch 32. For instance, the lower limit tKDNTJA is in the neighborhood of 30 r.p.m.

If an affirmative decision (YES) is obtained in step SO72, the control flow goes to step SO73 to determine whether an amount of change $|DNTJ_{i-1}-DNTJ_i|$ of the variation amplitude DNTJ is smaller than a predetermined upper limit tKDNTJS. The amount of change $|DNTJ_{i-1}-DNTJ_i|$ is a difference between the variation amplitude $DNTJ_i$ calculated in the last cycle of execution of the interruption routine of FIG. 12 and the variation amplitude $DNTJ_{i-1}$ calculated in the preceding cycle of execution of the interruption routine. The upper limit tKDNTJS is determined by experimentation to exclude an amount of change of the variation amplitude DNTJ, which amount of change is supposed to occur due to passage of the vehicle through a relatively narrow local raised or recessed area of a road surface. That is, if the amount of change $|DNTJ_{i-1}-DNTJ_i|$ is larger than the upper limit tKDNTJS, this change is considered to be caused by the local raised or recessed area of the road surface. For example, the upper limit tKDNTJS is in the neighborhood of 9 r.p.m. In the present embodiment, step SO73 corresponds to the amplitude change monitoring means 202 explained above.

If an affirmative decision (YES) is obtained in step SO73, the control flow goes to step SO74 to determine whether the half period DTJ calculated in the last cycle of execution of the interruption routine of FIG. 12 is held within a predetermined range between tKDTJA and tKDTJB, that is, whether an inequality tKDTJA≦DTJ≦tKDTJB is satisfied. The lower and upper limits tKDTJA and tKDTJB are determined by experimentation to assure accurate detection of a variation of the turbine impeller speed $N_T$ which is characteristic of a judder of the lock-up clutch 32. Namely, if the half period DTJ is held within the predetermined range, it is considered to represent a judder of the lock-up clutch 32. For instance, the lower and upper limits tKDTJA and tKDTJB are about 4 ms and about 20 ms, respectively. In the present embodiment, step SO74 corresponds to the variation period monitoring means 206 explained above.

If a negative decision (NO) is obtained in any of the above steps SO72–SO74, one cycle of execution of the routine of FIG. 11 is terminated without incrementing the JUDDER DETERMINATION counter CJADA. If an affirmative decision (YES) is obtained in all of the three steps SO72, SO73 and SO74, the control flow goes to step SO75 to increment the JUDDER DETERMINATION counter CJADA.

Referring back to the flag setting routine of FIG. 10, step SO7 (sub-routine of FIG. 11) is followed by step SO8 to determine whether the content of the JUDDER DETERMINATION counter CJADA is equal to or larger than a predetermined threshold tKNJADA. This threshold tKNJADA is determined by experimentation to determine whether the lock-up clutch 32 under the slip control is suffering from a judder which considerably influences the drivability of the vehicle or the slip control of the lock-up clutch 32 if the slip control continues. As described below, the decision in step SO8 is used to set the PROVISIONAL JUDDER DETERMINATION flag XJRDY. In the present embodiment, step SO8 corresponds to the first variation number monitoring means 212 explained above.

Figure 14:
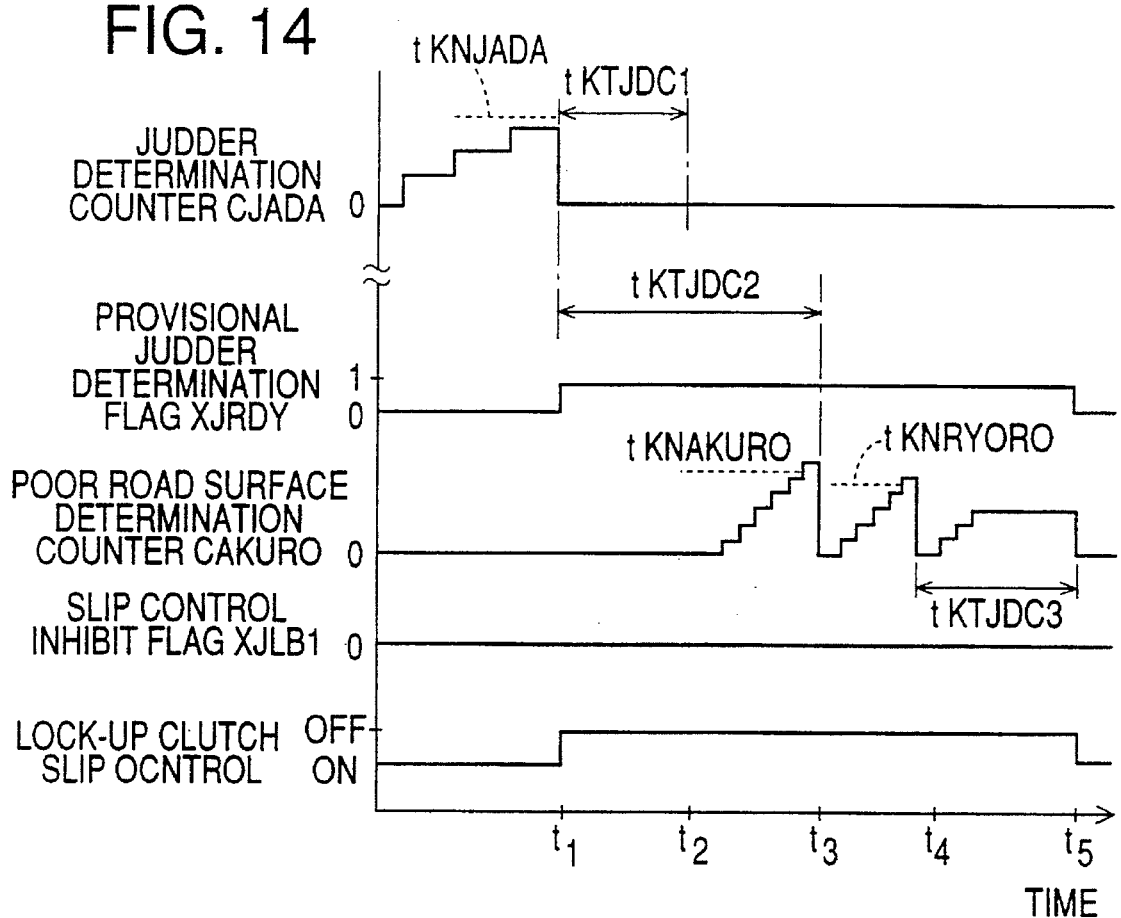
FIG. 14 is a time chart indicating the contents of counters and flags used in the routines of FIGS. 9 and 10, in the case of determination of a vehicle run on a bumpy road surface.
Figure 15:
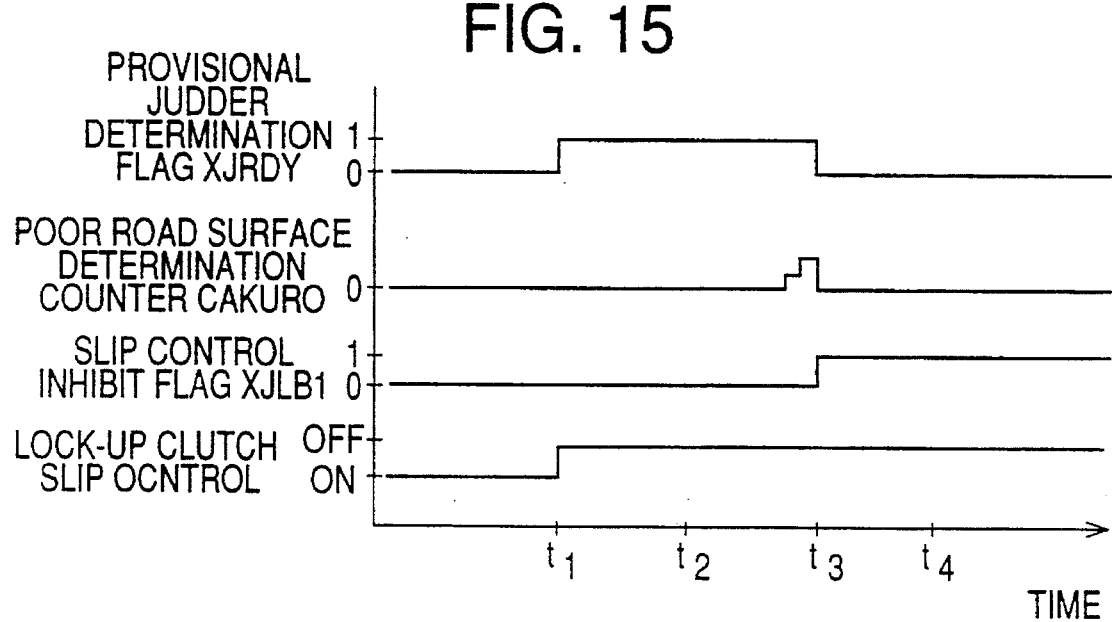
FIG. 15 is a time chart similar to that of FIG. 14, in the case of determination of the presence of a judder of the lock-up clutch.

If a negative decision (NO) is obtained in step SO8, one cycle of execution of the flag setting routine of FIG. 10 is terminated. If an affirmative decision (YES) is obtained in step SO8, the control flow goes to step SO9 corresponding to the slip control interrupting means 214 explained above, in which the PROVISIONAL JUDDER DETERMINATION flag XJRDY is set to "1". Then, the control flow goes back to step SO1. With the flag XJRDY set to "1" as described above, the affirmative decision (YES) is obtained in step SN5, and the lock-up relay valve 52 is turned off to interrupt the slip control of the lock-up clutch 32 by the slip control means 196. This state of the transmission controller 184 is indicated at t1 in the time charts of FIGS. 14 and 15. It is noted that the time chart of FIG. 14 indicates a case where it is determined that the vehicle is running on a generally poor or bumpy road surface, while the time chart of FIG. 15 indicates a case where it is determined that the lock-up clutch 32 is suffering from a judder.

If the PROVISIONAL JUDDER DETERMINATION flag XJRDY is set at "1" as indicated above, an affirmative decision (YES) is obtained in step SO3 in the next cycle of execution of the flag setting routine, and step SO10 is implemented to increment the timer CTJDC, which is adapted to measure a time lapse after the affirmative decision (YES) is obtained in step SO8, that is, after the PROVISIONAL JUDDER DETERMINATION flag XJRDY is set to "1". Step SO10 is followed by step SO11 to determine whether the content of the timer CTJDC has reached a predetermined value tKTJDC1 which corresponds to a first time duration. This time duration is determined so that the lock-up clutch 32 can be fully released within this time duration after the flag XJRDY is set to "1". For example, the first time duration is about 0.2 second. As described below, the POOR ROAD SURFACE DETERMINATION counter CAKURO is enabled to operate when the predetermined first time duration has passed after the flag XJRDY is set to "1". The counter CAKURO is adapted to count the number of variations of the turbine impeller speed $N_T$ which are caused primarily due to running of the vehicle on a poor or bumpy road surface. Since the counter CAKURO is disabled to operate during the predetermined first time duration, the counter CAKURO is prevented to count the number of variations of the speed $N_T$ which are caused immediately after the lock-up clutch 32 is commanded to be fully released in step SN9.

If a negative decision (NO) is obtained in step SO11, the control returns to step SO1. If an affirmative decision (YES) is obtained in step SO11, the control flow goes to step SO12 in which the POOR ROAD SURFACE DETERMINATION counter CAKURO is incremented. The counter CAKURO is incremented each time this step SO12 is implemented. This state of the transmission controller 184 is indicated at t2 in FIGS. 14 and 15. Like the JUDDER DETERMINATION counter CJADA, the POOR ROAD SURFACE DETERMINATION counter CAKURO counts the number of variations of the turbine impeller speed $N_T$. However, the counter CAKURO continues to operate until it is reset to "0" in step SO4, SO16 or SO22. Step SO12 is followed by step SO13 to determine whether the content of the timer CTJDC has reached a predetermined value tKTJDC2 which corresponds to a second time duration. Upon expiration of this second time duration after the flag XJRDY is set to "1", the content of the POOR ROAD SURFACE DETERMINATION counter CAKURO is checked to determine whether the condition of the road surface on which the vehicle is running is poor or not. The second time duration is determined to be sufficient but as short as possible to determine the road surface condition. For instance, the second time duration is about 0.7 second.

When step SO13 is implemented for the first time, a negative decision (NO) is obtained in step SO13, and the control flow goes to step SO14 to determine whether the content of the timer CTJDC has exceeded the predetermined value tKTJDC2. Initially, a negative decision (NO) is obtained in step SO14, and the control returns to step SO1.

With the routine of FIG. 10 repeatedly executed, an affirmative decision (YES) is obtained in step SO13, that is, the second time duration corresponding to the threshold value tKTJDC2 has passed, and step SO15 is implemented to determine whether the content of the POOR ROAD SURFACE DETERMINATION counter CAKURO is equal to or larger than a predetermined threshold tKNAKURO. If the condition of the road surface on which the vehicle is running is comparatively continuously poor with successive raised and recessed areas being present on the road surface, an affirmative decision (YES) is obtained in step SO15. In this case, the control flow goes to step SO16 to reset the counter CAKURO to "0", and then returns to step SO1. This state of the transmission controller 184 is indicated at t3 in FIG. 14.

If a negative decision (NO) is obtained in step SO15 (if the content of the counter CAKURO is smaller than the threshold tKNAKURO) while the slip control of the lock-up clutch 32 is interrupted, namely, while the PROVISIONAL JUDDER DETERMINATION flag XJRDY is set at "1", it means that the content of the JUDDER DETERMINATION counter CJADA reached the threshold tKNJADA (and the affirmative decision was obtained in step SO8) because the lock-up clutch 32 suffered from a judder which involved a large number of periodic variations of the speed $N_T$. In this case, it is desirable to inhibit the slip control of the lock-up clutch 32, more precisely, to inhibit the slip control means 196 from resuming the slip control of the lock-up clutch 32 after the interruption. Therefore, the SLIP CONTROL INHIBIT flag XJLB1 is set to "1". This state of the transmission controller 184 is indicated at t3 in FIG. 15. Consequently, the affirmative decision (YES) is obtained in step SN1 of the slip control routine of FIG. 9, and step SN8 is implemented to inhibit resuming the slip control of the lock-up clutch 32 which has been interrupted with the PROVISIONAL JUDDER DETERMINATION flag XJRDY being set at "1". That is, the slip control is terminated as a result of determination of the presence of a judder of the lock-up clutch 32.

It will be understood that steps SO13 and SO15 correspond to first monitoring means of the second variation number monitoring means 216 explained above, while step SO17 corresponds to the slip control terminating means 210 also explained above.

If the content of the timer CTJDC is not equal to the predetermined value tKTJDC2, the control flow goes to step SO14 to determine whether the content of the timer CTJDC is larger than the predetermined value tKTJDC2. An affirmative decision (YES) is obtained in step SO14 in cycles of execution of the routine of FIG. 10 after the affirmative decision is obtained in step SO13. In these cycles, step SO18 is implemented to determine whether the content of the POOR ROAD SURFACE DETERMINATION counter CAKURO is equal to or larger than a predetermined threshold tKNRYORO. When step SO18 is implemented for the first time, a negative decision (NO) is obtained in step SO18, and the control flow goes to step SO19 to increment a GOOD ROAD SURFACE DETERMINATION timer CTJDC3. Step SO19 is followed by step SO20 to determine whether the content of the timer CTJDC3 is equal to or larger than a predetermined threshold tKTJDC3 corresponding to a predetermined third time duration. During this time duration, step SO18 is repeatedly implemented to determine whether the content of the counter CAKURO has reached the threshold tKNRYORO. If the content of the counter CAKURO does not reach the threshold tKNRYORO within the third time duration, it means that the number of periodic variations of the speed $N_T$ during that third time duration is small enough to be able to determine that the vehicle is now running on a good road surface. In other words, the third time duration is determined to permit this determination.

When step SO20 is implemented for the first time, a negative decision (NO) is obtained, and the control returns to step SO1.

If an affirmative decision (YES) is obtained in step SO18 before the third predetermined time duration corresponding to the threshold tKTJDC3 has passed after the second predetermined time corresponding to the threshold tKTJDC2 has passed, the control flow goes to steps SO22 and SO23 to reset the POOR ROAD SURFACE DETERMINATION counter CAKURO and the GOOD ROAD SURFACE DETERMINATION timer CTJDC3. Then, the control returns to step SO1. This state of the transmission controller 184 is indicated at t4 in FIG. 14.

If the content of the timer CTJDC3 has reached the threshold value tKTJDC3 corresponding to the third time duration before the affirmative decision is obtained in step SO18, that is, if the negative decision (NO) is obtained continuously in step SO18 during the third time duration corresponding to the threshold tKTJDC3, an affirmative decision (YES) is obtained in step SO20, and the control flow goes to step S021 to reset the PROVISIONAL JUDDER DETERMINATION flag XJRDY to "0". Consequently, the negative decision (NO) is obtained in step SN5, and the slip control of the lock-up clutch 32 is resumed in step SN6.

It will be understood that step SO21 corresponds to the slip control resuming means 218 explained above, and that steps SO18 and SO20 correspond to second monitoring means of the second variation number monitoring means 216. The first monitoring means (SO13, SO15) and the second monitoring means (SO18, SO20) cooperate to provide the second variation number monitoring means (216). It will also be understood that the first variation number monitoring means 212, slip control interrupting means 214 and second variation number monitoring means 216 constitute a major portion of the judder determining means 208 also indicated above.

Figure 16:
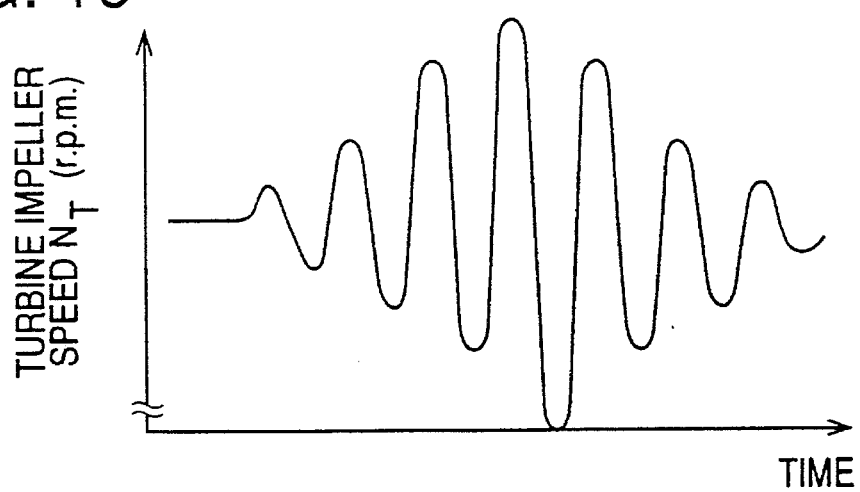
FIG. 16 is a graph depicting a variation of the turbine impeller speed which occurs due to a instantaneous passage of the vehicle through a local raised or recessed area of the road surface.
Figure 18:
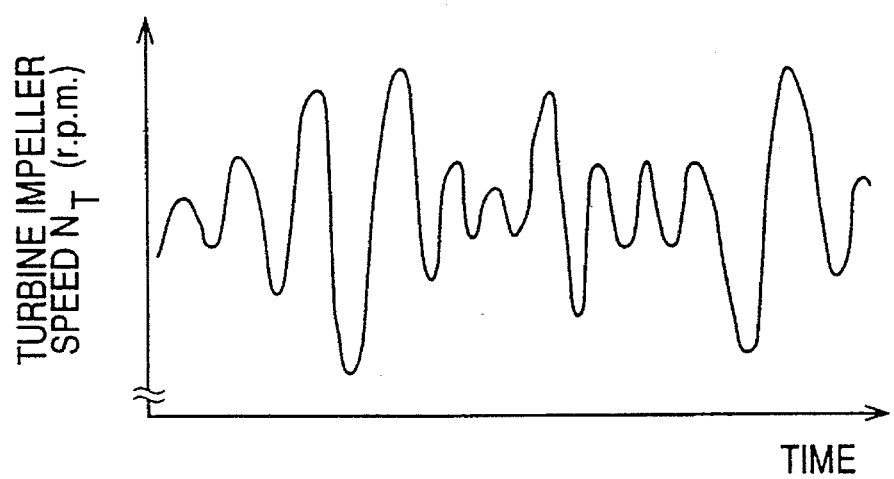
FIG. 18 is a graph depicting a variation of the turbine impeller speed which occurs due to a vehicle run on an unpaved or any other poor or bumpy road surface.
Figure 19:
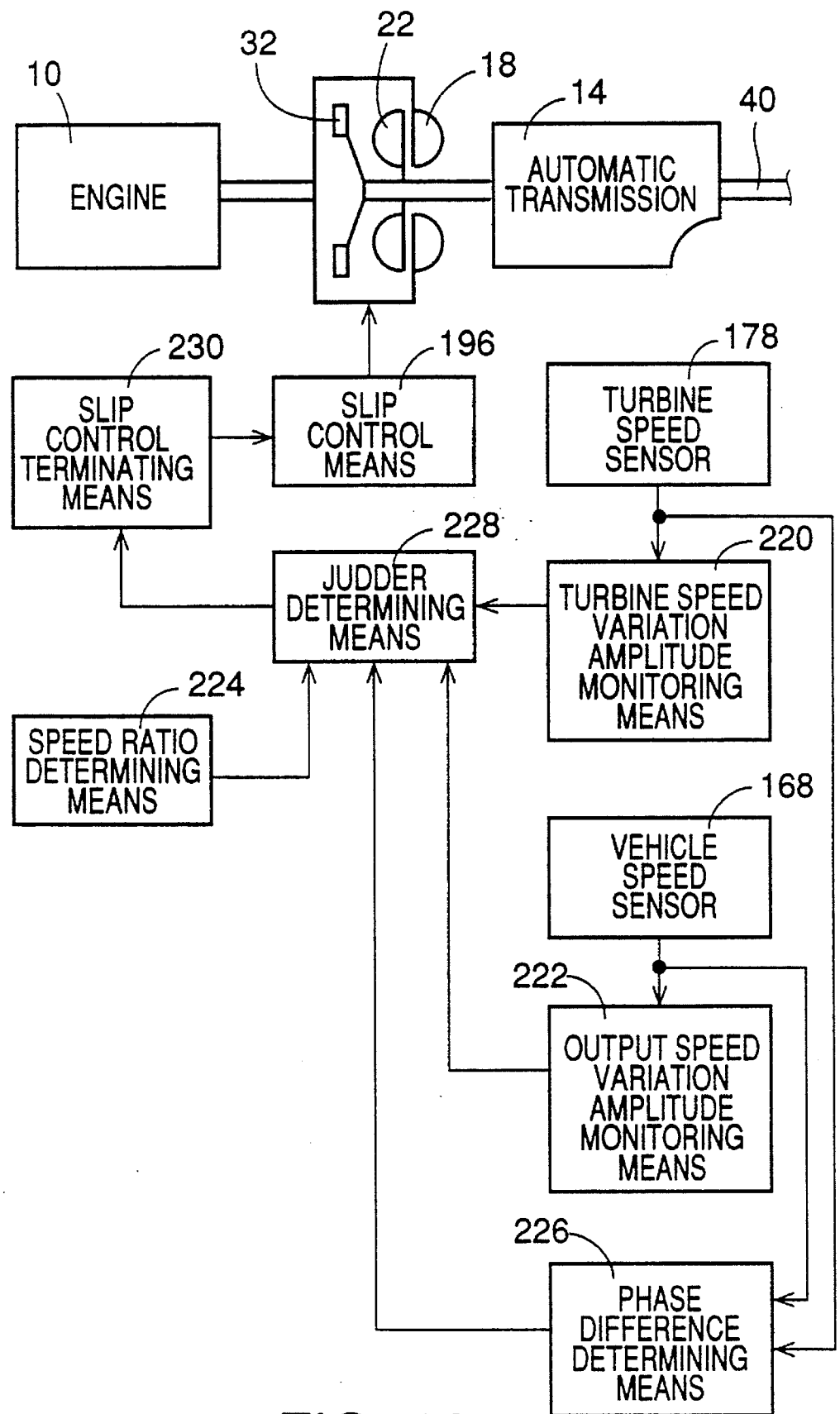
FIG. 19 is a block diagram corresponding to that of FIG. 8, illustrating a second embodiment of the present invention.

The present embodiment constructed as described above is adapted such that the amplitude change monitoring means 202 (step SO73) prevents the JUDDER DETERMINATION counter CJADA from counting the presently detected variation of the turbine impeller speed $N_T$ in step SO75 if the amount of change $|DNTJ_{i-1} - DNTJ_i|$ of the present variation amplitude $DNTJ_i$ with respect to the preceding variation amplitude $DNTJ_{i-1}$ is larger than the predetermined upper limit tKDNTJS. In other words, the present variation of the speed $N_T$ which considerably differs from the preceding variation is not used for the determination in step SO8 by the judder determining means 208, more specifically by the first variation number monitoring means 212. Where the vehicle passes a relatively narrow local raised or recessed area of a generally good road surface, the rotating speed $N_T$ of the turbine impeller 22 usually has a variation waveform as indicated in the graph of FIG. 16. As is apparent from this graph, the amount of change $|DNTJ_{i-1} - DNTJ_i|$ of the variation amplitude DNTJ is relatively large immediately after the variation begins or immediately before the variation ends. In the lock-up clutch control apparatus according to the present embodiment of the invention, the amplitude change monitoring means 202 excludes such variation of the speed $N_T$ that causes the negative decision in step SO73, whereby such variation is not used by the judder determining means 208. Thus, the judder determining means 208 permits accurate determination as to whether the lock-up clutch 32 is suffering from a judder or not. This arrangement eliminates unnecessary or inappropriate interruption of the slip control of the lock-up clutch 32, leading to improved fuel economy of the vehicle. The present embodiment is capable of dealing with a variation of the turbine impeller speed $N_T$ as indicated in FIG. 18 during running of the vehicle on a generally or continuously poor road surface, as well as the variation as indicated in FIG. 16 due to passage of the vehicle through the relatively narrow local raised or recessed area of a generally good road surface.

Figure 17:
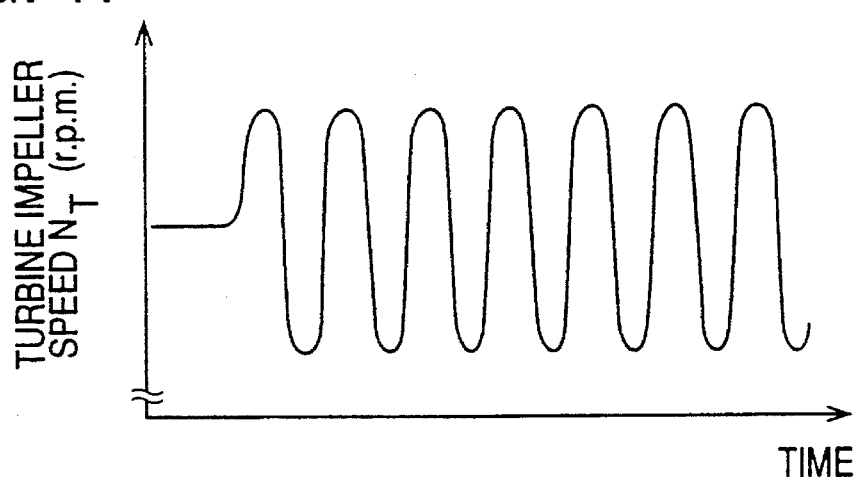
FIG. 17 is a graph depicting a variation of the turbine impeller speed which occurs due to a judder of the lock-up clutch under slip control by the slip control apparatus.

The present embodiment is also adapted such that the variation period monitoring means 206 (step SO74) determines whether the half period DTJ calculated in step SW3 by the variation period determining means 204 is held within the predetermined range between tKDTJA and tKDTJB, in order to exclude such variation of the turbine impeller speed $N_T$ that causes the half period to be outside the predetermined range, namely, to prevent the JUDDER DETERMINATION counter CJADA from counting such variation, or to prevent the judder determining means 208 (more precisely, the first variation number monitoring means 212) from using such variation in the determination in step SO8. Although the period of the variation waveform of the speed $N_T$ during passage of the vehicle through a relatively narrow local raised or recessed area of a generally good road surface is generally unstable, the period of the variation waveform due to a judder of the lock-up clutch 32 is comparatively stable or constant as indicated in FIG. 17, while being within a certain narrow range which is determined by the material of the friction members and the property of the working oil. Therefore, if the half period DTJ of the variation waveform of the speed $N_T$ during the slip control of the lock-up clutch 32 is outside the predetermined range between tKDTJA and tKDTJB, it means a comparatively high possibility that the lock-up clutch 32 is not juddering. In this case, the detected variation of the speed $N_T$ is ignored in step SO74 by the variation period monitoring means 206, and is not used by the judder determining means 208 to determine the presence of a judder of the lock-up clutch 32. Accordingly, the accuracy of determination by the judder determining means 208 is improved, whereby unnecessary or inappropriate interruption of the slip control of the lock-up clutch 32 is eliminated, with a result of an improvement in the fuel economy of the vehicle.

The judder determining means 208 includes: the first variation number monitoring means 212 for determining whether the number of variations of the turbine impeller speed $N_T$ detected by the speed variation monitoring means 198 during the slip control of the lock-up clutch 32 is smaller than the predetermined threshold tKNJADA; the slip control interrupting means 214 for interrupting the slip control of the lock-up clutch 32 by the slip control means 198 if the first variation number monitoring means 212 determines that the number of the variations is not smaller than the threshold tKNJADA; and the second variation number monitoring means 216 for determining whether the number of variations of the turbine impeller speed $N_T$ during the interruption of the slip control of the lock-up clutch 32 reaches the predetermined threshold tKNAKURO or tKNRYORO. According to this arrangement, the determination in step SO15 that the number of the variations of the speed $N_T$ during an initial portion (corresponding to tKTJDC2) of the interruption of the slip control of the lock-up clutch 32 is smaller than the threshold tKNAKURO indicates that the affirmative decision was obtained in step SO8 as a result of an occurrence of a judder of the lock-up clutch 32. Thus, the judder can be correctly detected with high accuracy. In this case, the slip control of the lock-up clutch 32 is terminated in step SO17 by the slip control terminating means 210.

The slip control apparatus according to the present embodiment further includes the slip control resuming means 218 (step SO21) for resuming the slip control of the lock-up clutch 32 which has been interrupted by the slip interrupting means 214, if the number of variations of the turbine impeller speed $N_T$ as determined in step SO18 by the second variation number monitoring means 216 is smaller than the threshold tKNRYORO when the predetermined time (corresponding to the threshold tKTJDC3) has passed, that is, when the affirmative decision is obtained in step SO20. Where the affirmative decision (YES) is obtained in step SO15, that is, where the number of the variations of the speed $N_T$ has reached the threshold tKNAKURO during the initial portion of the interruption of the slip control of the lock-up clutch 32, it indicates that the affirmative decision was obtained in step SO8 during the slip control of the lock-up clutch 32 because the vehicle ran on a generally poor or bumpy road surface, and not because the lock-up clutch 32 suffered from a judder. In this case, if it is found that the vehicle is now running on a good road surface, the slip control of the lock-up clutch 32 should be resumed. To this end, the present embodiment is adapted such that the PROVISIONAL JUDDER DETERMINATION flag XJRDY is reset to "0" in step S021 corresponding to the slip control resuming means 218 if the number of the variations of the speed $N_T$ during the latter portion of the interruption of the slip control is smaller than the threshold tKNRYORO, that is, if the affirmative decision (YES) is obtained in step SO20. Thus, the present embodiment is adapted to resume the slip control of the lock-up clutch 32 in step SO21 only after it is determined in steps SO18 and SO20 that the road surface is improved to a good condition. This arrangement is effective to prevent repeated interruption and resumption of the slip control of the lock-up clutch 32, which would deteriorate the drivability of the vehicle.

As indicated above, the present slip control apparatus further includes the slip control terminating means 210 for inhibiting the slip control means 196 from resuming the slip control of the lock-up clutch 32, that is, for finally terminating the slip control, if it is determined that the lock-up clutch 32 suffered from a judder during the slip control, that is, if the second variation number monitoring means 216 determines in step SO15 that the number of the variations of the speed $N_T$ detected by the speed variation monitoring means 198 during the initial portion of the interruption of the slip control is smaller than the threshold tKNAKURO, as explained above. Therefore, the slip control is inhibited until the lock-up clutch 32 recovers the normal operating condition (until the friction members of the clutch 32 recover the normal operating condition, for example, until the engine 10 is re-started after it is once stopped).

The present apparatus is also adapted such that the POOR ROAD SURFACE DETERMINATION counter CAKURO is enabled to operate only after the predetermined time corresponding to the threshold tKTJDC1 for the timer CTJDC has passed after the slip control of the lock-up clutch 32 is interrupted (after the PROVISIONAL JUDDER DETERMINATION flag is set to "1"), that is, only after the lock-up clutch 32 has been fully released. This arrangement assure accurate determination in step SO15.

Figure 20:
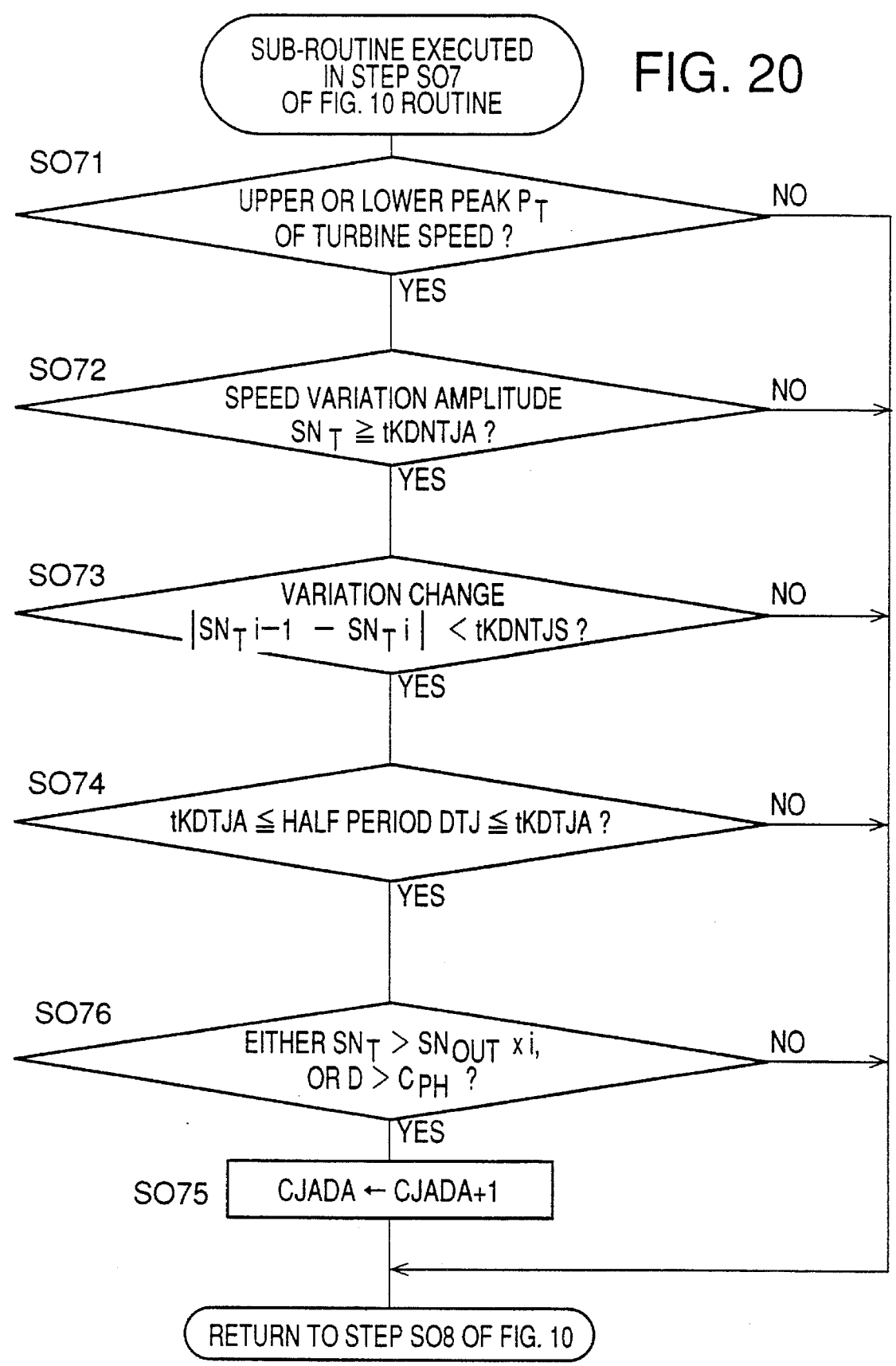
FIG. 20 is a flow chart illustrating a flag setting routine used in the second embodiment of FIG. 19 in place of the flag setting routine of FIG. 11 of the first embodiment.
Figure 21:
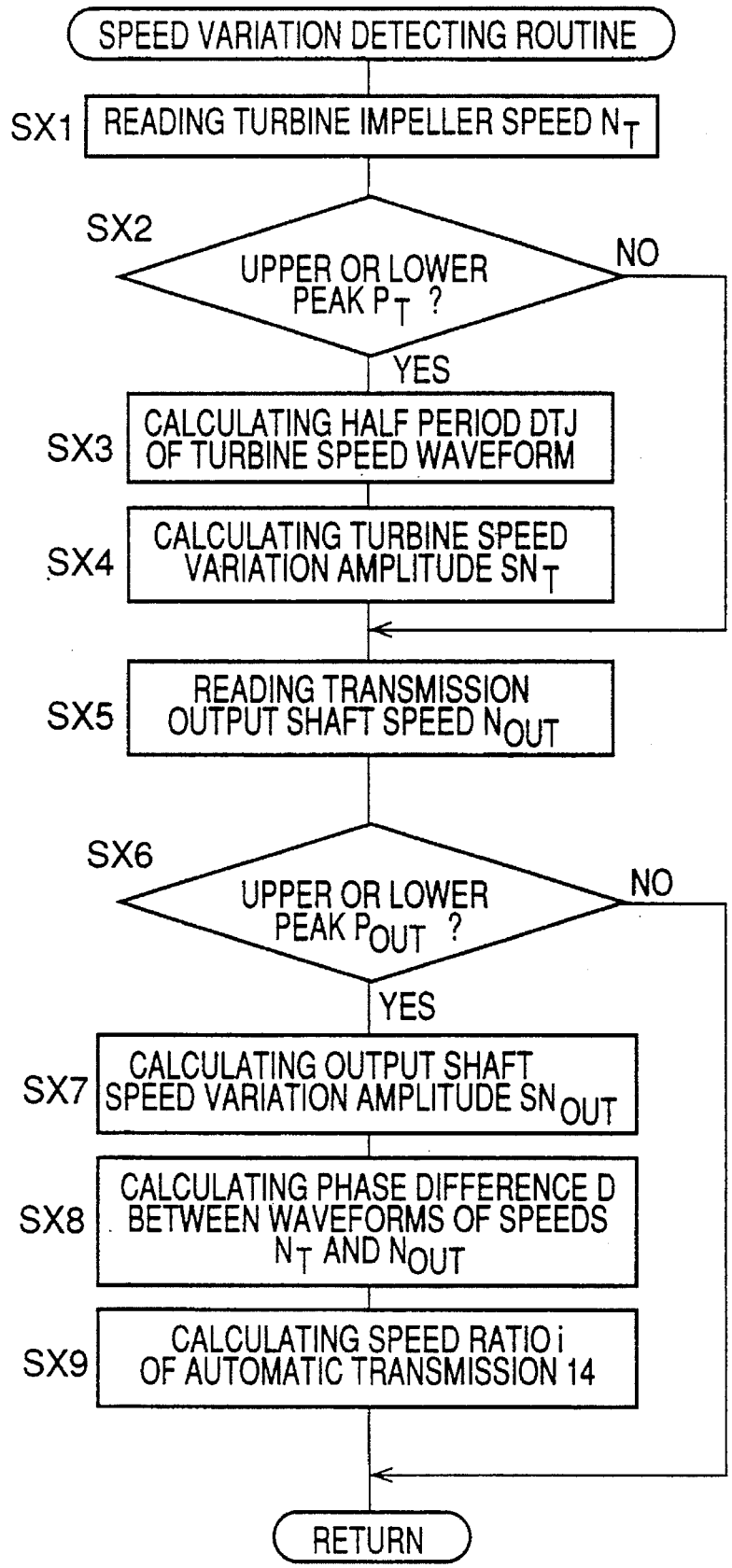
FIG. 21 is a flow chart illustrating an interruption routine used in the second embodiment in place of the interruption routine of FIG. 12 of the first embodiment.
Figure 22:
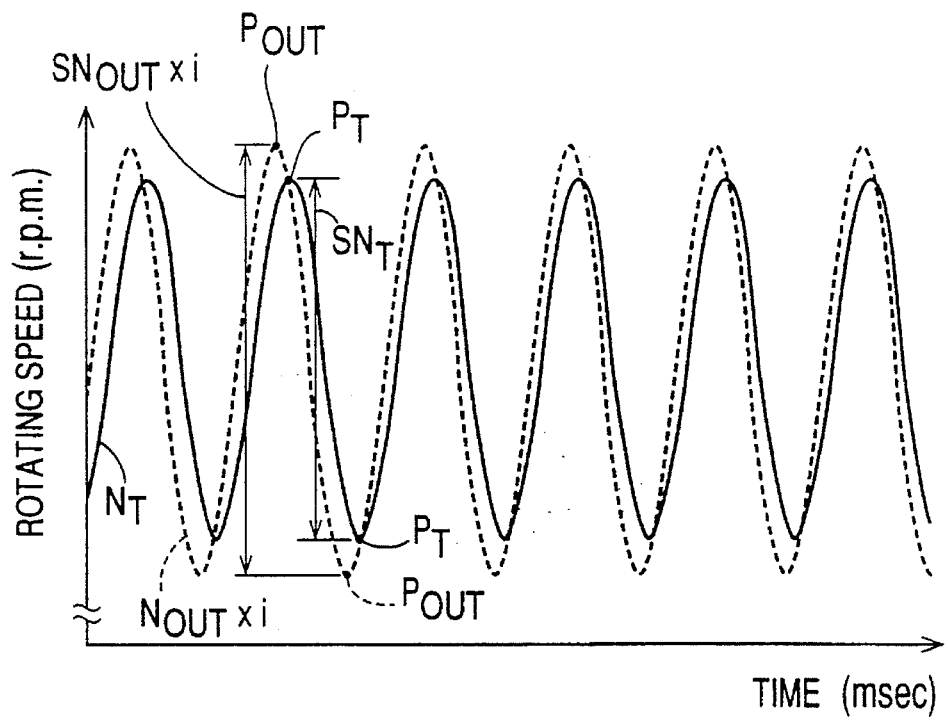
FIG. 22 is a time chart indicating a variation of 10 the turbine impeller speed $N_T$ (indicated by solid line) and a variation of the transmission output shaft speed $N_{OUT}$ as multiplied by the speed ratio i of the automatic transmission ($N_{OUT} \times i$ being indicated by broken line), the variations occurring due to vehicle running on a bumpy road surface during slip control of the lock-up clutch.
Figure 23:
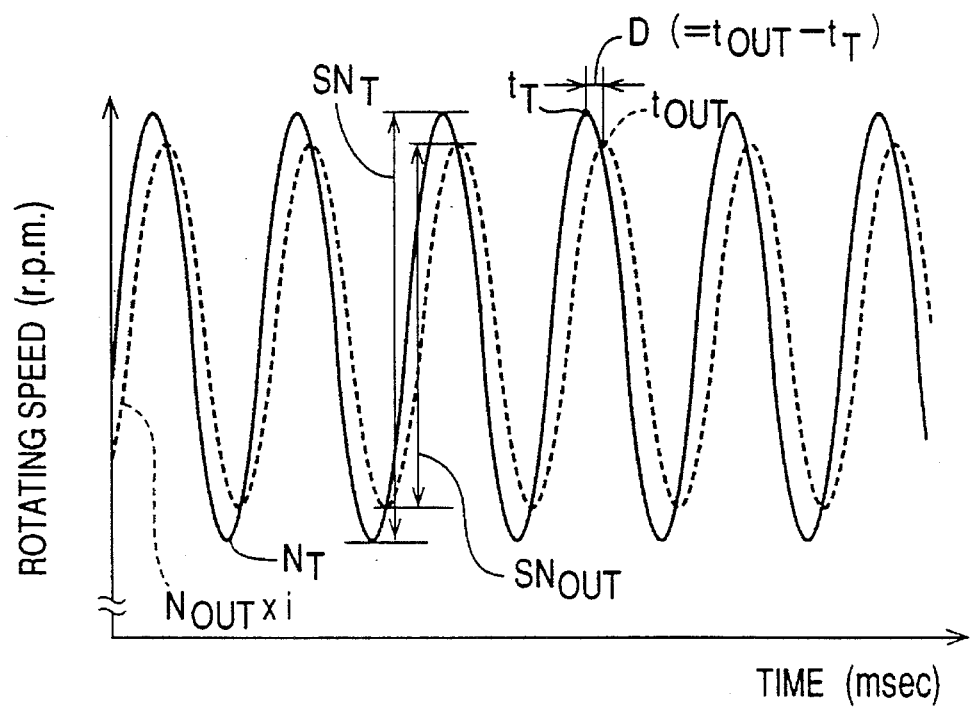
FIG. 23 is a time chart indicating the variations of the turbine impeller speed $N_T$ and the transmission output shaft speed $N_{OUT}$ multiplied by the speed ratio i, which variations occur due to juddering of the lock-up clutch during the slip control.

Referring next to FIGS. 19–23, there will be described a second embodiment of this invention. In this embodiment which is schematically illustrated in the block diagram of FIG. 19, the transmission controller 184 incorporates the slip control means 196 described above, and turbine speed variation amplitude monitoring means 220, output speed variation amplitude monitoring means 222, speed ratio determining means 224, phase difference determining means 226, judder determining means 228 and slip control terminating means 230. The turbine speed variation amplitude monitoring means 220 is adapted to determine an amplitude $SN_T$ of a variation of the rotating speed $N_T$ of the turbine impeller 22 which is detected by the turbine speed sensor 178. The output speed variation amplitude monitoring means 222 is adapted to determine an amplitude $SN_{OUT}$ of a variation of the rotating speed $N_{OUT}$ of the countershaft or output shaft 40 of the automatic transmission 14, which speed $N_{OUT}$ is detected by the vehicle speed sensor 168. In FIGS. 22 and 23, the turbine impeller speed $N_T$ is indicated by solid line, and the output shaft speed $N_{OUT}$ as multiplied by the speed ratio i of the transmission 14 is indicated by broken line.

The speed ratio determining means 224 is adapted to determine the actual speed ratio i ($N_T/N_{OUT}$) of the automatic transmission 14, on the basis of shift commands generated by the transmission controller 184 to control the solenoid-operated valves S1, S2 to select one of the operating positions of the transmission 14, or to calculate the actual speed ratio i from the input and output speeds $N_T$ and $N_{OUT}$ of the transmission 14. The phase difference determining means 226 is adapted to determine a phase difference D between the variation waveforms of the turbine impeller speed $N_T$ detected by the turbine speed sensor 178 and the speed $N_{OUT}$ of the output shaft 40 of the automatic transmission 14 detected by the vehicle speed sensor 168. The phase difference D is indicated in FIG. 23.

The judder determining means 228 is adapted to determine whether the lock-up clutch 32 under slip control by the slip control means 196 is suffering from a "judder". This determination is effected on the basis of a first determination as to whether the variation amplitude $SN_T$ of the turbine impeller speed $N_T$ is larger than a product ($SN_{OUT} \times i$) of the variation amplitude $SN_{OUT}$ of the output speed $N_{OUT}$ of the transmission output shaft 40 and the speed ratio i of the automatic transmission 14. The determination by the judder determining means 228 is also effected on the basis of a second determination as to whether the phase difference D is larger than a predetermined reference value $C_{PH}$. As described below with respect to step SO76 of the sub-routine of FIG. 20, the judder determining means 228 determines that the lock-up clutch 32 is suffering from a judder, if an affirmative decision is obtained in at least one of the first and second determinations indicated above.

The slip control terminating means 230 is adapted to terminate the slip control of the lock-up clutch 32 by the slip control means 196 if the judder determining means 228 determines the presence of a judder of the lock-up clutch 32. The slip control terminating means 230 inhibits the slip control of the lock-up clutch 32 after the termination, for a predetermined suitable length of time. Usually, a judder of the lock-up clutch 32 occurs due to deteriorated friction condition thereof. Therefore, the slip control terminating means 230 is preferably adapted to inhibit the slip control of the lock-up clutch 32 until the friction condition of the lock-up clutch is restored to the normal condition, for example, until the engine is re-started after it is turned off.

As in the first embodiment, the transmission controller 184 executes the slip control routine of FIG. 9 and the flag setting routine of FIG. 10 in the present second embodiment. However, the sub-routine of FIG. 20 is executed in step SO7 of the flag setting routine of FIG. 10, in place of the sub-routine of FIG. 11. This sub-routine illustrated in FIG. 20 includes steps SO71–SO75 which are substantially identical with those of the sub-routine of FIG. 11. In the present embodiment, however, the upper and lower peaks of the variation waveform of the turbine impeller speed $N_T$ are represented by $P_T$ as indicated in step SO71 in FIG. 22, and the variation amplitude of the turbine impeller speed $N_T$ is represented by $SN_T$ as indicated in steps SO72 and SO 73 and in FIGS. 22 and 23, rather than DNTJ indicated in FIG. 13.

However, the sub-routine of FIG. 20 is different from the sub-routine of FIG. 11 in that step SO76 is interposed between steps SO74 and SO75. That is, the JUDDER DETERMINATION counter CJADA is incremented if the affirmative decision (YES) is obtained in step SO76 as well as in steps SO72, SO73 and SO74. In this embodiment, therefore, the counter CJADA is incremented if all of the four conditions corresponding to steps SO72–SO74 and SO76 are satisfied, contrary to the first embodiment wherein the counter CJADA is incremented if all of the three conditions corresponding to steps SO72–SO74 are satisfied.

The addition of step SO76 in the sub-routine of FIG. 20 requires modifications of the interruption routine from that of FIG. 12 to that of FIG. 21. Described in detail, the interruption routine of FIG. 21 is initiated with step SX1 to read the turbine impeller speed $N_T$ detected by the turbine speed sensor 178. Step SX1 is followed by step SX2 to determine whether the value of the speed $N_T$ preceding the value which has been read in step SX1 is an upper or lower peak (maximal or minimal point) $P_T$ of the waveform of the speed $N_T$. This determination is made according to a peak determining algorithms well known in the art. If a negative decision (NO) is obtained in step SX1, one cycle of execution of the present interruption routine is terminated. If an affirmative decision (YES) is obtained in step SX2, the control flow goes to step SX3 to calculate a length of time DTJ between the two adjacent upper and lower peaks (between the peak determined in step SX2 in the present cycle and the preceding peak determined in step SX2 in the preceding cycle). This period DTJ is equal to a half of the period of the variation waveform of the turbine impeller speed $N_T$. Step SX3 is followed by step SX4 corresponding to the turbine speed variation amplitude monitoring means 220, to calculate the variation amplitude $SN_T$ of the turbine impeller speed $N_T$ during the calculated half period DTJ. The variation amplitude $SN_T$ is a difference between the adjacent upper and lower peak values $P_T$. Like the interruption routine of FIG. 12, the interruption routine of FIG. 21 is executed with a predetermined cycle time, for example, 4 ms, to calculate the half period DTJ and the variation amplitude $SN_T$.

Then, the control flow goes to step SX5 to read the speed $N_{OUT}$ of the output shaft 40 of the automatic transmission 14 detected by the vehicle speed sensor 168. Step SX5 is followed by step SX6 to determine whether the value of the speed $N_{OUT}$ preceding the value which has been read in step SX5 is an upper or lower peak $P_{OUT}$ of the waveform of the speed $N_{OUT}$. This determination is also made according to an algorithm well known in the art. If a negative decision (NO) is obtained in step SX6, one cycle of execution of the present routine is terminated. If an affirmative decision (YES) is obtained in step SX6, the control flow goes to step SX7 corresponding to the output speed variation amplitude monitoring means 222, to calculate the variation amplitude $SN_{OUT}$ of the output shaft speed $N_{OUT}$ of the automatic transmission 14. The variation amplitude $SN_{OUT}$ is a difference between the adjacent upper and lower peaks $P_{OUT}$ of the waveform of the speed $N_{OUT}$.

Then, the control flow goes to step SX8 corresponding to the phase difference determining means 226, to determine the phase difference D between the variation waveforms of the turbine impeller speed $N_T$ detected by the turbine speed sensor 178 and the output shaft speed $N_{OUT}$ detected by the vehicle speed sensor 168. Suppose the upper peak $P_T$ of the turbine impeller speed $N_T$ is detected in step SX2 at point of time $t_T$ while the upper peak $P_{OUT}$ of the output shaft speed $N_{OUT}$ which is nearest to the detected upper peak $P_T$ is detected in step SX6 at a point of time $t_{OUT}$, the phase difference D is obtained as a time difference ($t_{OUT}-t_T$) between the points of time $t_{OUT}$ and $t_T$. Step SX8 is followed by step SX9 corresponding to the speed ratio determining means 224, to determine the actual speed ratio i ($=N_T/N_{OUT}$) of the automatic transmission 14. The speed ratio i may be calculated from the detected input shaft speed $N_T$ of the transmission 14 (turbine impeller speed $N_T$) and the output shaft speed $N_{OUT}$ of the transmission 14, or determined on the basis of shift commands generated by the transmission controller 184 to control the solenoid-operated valves S1, S2 to select one of the operating positions of the transmission 14.

Referring back to the sub-routine of FIG. 20, step SO76 provided in this second embodiment is formulated to effect a first determination as to whether the variation amplitude $SN_T$ of the turbine impeller speed $N_T$ is larger than a product ($SN_{OUT} \times i$) of the variation amplitude $SN_{OUT}$ of the output speed $N_{OUT}$ and the speed ratio i of the automatic transmission 14, and a second determination as to whether the phase difference D of the waveforms of the turbine impeller speed $N_T$ and the output speed $N_{OUT}$ is larger than the predetermined reference value $C_{PH}$. If an affirmative decision is made in at least one of the first and second determinations, it means that the speed variation of the transmission 14 is transmitted in the direction from the input shaft 20 toward the output shaft 40. In this case, an affirmative decision (YES) is obtained in step SO76, and the control flow goes to step SO75 to increment the JUDDER DETERMINATION counter CJADA.

The determination in step SO76 is based on a finding that a speed variation of the automatic transmission 14 which arises from a judder of the lock-up clutch 32 is transmitted in the direction from the input shaft 20 toward the output shaft 40. Described more particularly, a periodic speed variation of the transmission 14 propagated from one of the input and output shafts 20, 40 toward the other tends to be attenuated and undergo a phase shift under an influence of various factors or parameters such as torsion and inertia of the rotary members of the transmission 14, viscosity of the working fluid and backlash of the gears in the transmission 14. During slip control of the lock-up clutch 32, a vehicle run on a bumpy road surface will cause a speed variation of the transmission 14, which is transmitted from the output shaft 40 toward the input shaft 20. In this case, the turbine impeller speed $N_T$ periodically varies as indicated by solid line in FIG. 22, while the output shaft speed $N_{OUT}$ multiplied by the speed ratio i periodically varies as indicated by broken line in FIG. 22. On the other hand, a judder of the lock-up clutch 32 during under slip control will cause a speed variation, which is transmitted from the input shaft 20 toward the output shaft 40. In this case, the turbine impeller speed $N_T$ periodically varies as indicated by solid line in FIG. 23, while the output shaft speed $N_{OUT}$ multiplied by the speed ratio i periodically varies as indicated by broken line in FIG. 23. It will be understood from FIG. 23 that when the speed variation is transmitted from the input shaft 20 toward the output shaft 40, the variation amplitude $SN_T$ is larger than ($SN_{OUT} \times i$), and the phase difference D ($=t_{OUT}-t_T$) is positive, that is, the phase of the variation waveform of the output speed $N_{OUT}$ is advanced with respect to the variation waveform of the turbine impeller speed $N_T$. When the speed variation is transmitted from the output shaft 40 toward the input shaft 20, the variation amplitude $SN_T$ is smaller than ($SN_{OUT} \times i$), and the phase of the variation waveform of the turbine impeller speed $N_T$ is advanced with respect to the variation waveform of the output speed $N_{OUT}$. Thus, step SO76 is adapted to determine that the lock-up clutch 32 is juddering, if it is determined that the speed variation is transmitted in the direction from the input shaft 20 toward the output shaft 40, namely, if the variation amplitude $SN_T$ of the turbine impeller speed $N_T$ is larger than the variation amplitude $SN_{OUT}$ of the output speed $N_{OUT}$ multiplied by the speed ratio i, and/or if the phase difference D ($t_{OUT} - t_T$) of the variation waveform of the output speed $N_{OUT}$ with respect to the variation waveform of the turbine impeller speed $N_T$ is positive.

In the present second embodiment, the turbine speed variation amplitude monitoring means 220 (step SX4) determines the variation amplitude $SN_T$ of the rotating speed $N_T$ of the turbine impeller 22, while the output speed variation amplitude monitoring means 222 (step SX7) determines the variation amplitude $SN_{OUT}$ of the rotating speed of the output shaft 40 of the automatic transmission 14. Further, the speed ratio determining means 224 (step SX9) determines the speed ratio i of the automatic transmission. The judder determining means 228 (steps SO7 and SO8) determines the presence of a judder of the lock-up clutch 32 if the variation amplitude $SN_T$ of the turbine impeller speed $N_T$ is larger than the product ($SN_{OUT} \times i$) of the variation amplitude $SN_{OUT}$ of the output speed $N_{OUT}$ of the automatic transmission 14 and the speed ratio i of the automatic transmission 14. Therefore, the present second embodiment does not require a vibration sensor for detecting or monitoring the vibrations of a suspension system or a body of the vehicle, but utilizes the turbine speed sensor 178 and the vehicle speed sensor 168 which are required to control shifting actions of the automatic transmission 14. Accordingly, the lock-up slip control apparatus according to the present embodiment is simplified in construction. Further, the present apparatus does not use or monitor the vibrations received from the road surface through the suspension system, but uses the variation amplitude values $SN_T$ and $SN_{OUT}$ of the turbine impeller speed $N_T$ and transmission output shaft speed $N_{OUT}$. This arrangement permits significantly improved accuracy of determination by the judder determining means 228, without an influence of the weight and size of the vehicle body and the air pressures of the wheel tires.

The present second embodiment is also adapted such that the phase difference determining means 226 (step SX8) determines the phase difference D between the variation waveform of the speed $N_T$ of the turbine impeller 22 detected by the turbine speed sensor 178 and the variation waveform of the speed $N_{OUT}$ of the output shaft 40 of the automatic transmission 14. The judder determining means 228 determines the presence of a judder of the lock-up clutch 32 if the phase difference D is larger than the predetermined reference value $C_{PH}$. This arrangement provides the advantages described just above.

If the judder determining means 228 determines the presence or an occurrence of a judder of the lock-up clutch 32, the slip control terminating means 230 terminates the slip control of the lock-up clutch 32 by the slip control means 196, and inhibits the slip control until the deteriorated friction condition of the lock-up clutch 32 is restored to the normal condition, for example, until the engine is re-started after it is stopped after the termination of the slip control. Therefore, once the judder of the lock-up clutch 32 takes place, the judder will not take place again in a short time.

While the present invention has been described above in detail in its presently preferred embodiments, it is to be understood that the invention is not limited to the details of the illustrated embodiment, but may be otherwise embodied.

In the illustrated first embodiment, the variation period determining means 204 (SW3) is adapted to calculate the half period DTJ of the variation waveform of the turbine impeller speed $N_T$. However, the period determining means 204 may be modified to calculate the full period between the adjacent two upper or lower peaks, or a time duration which is two times the full period. In this case, the variation period monitoring means 206 (SO74) determines whether that full period or time duration is held within a predetermined range.

In the illustrated first and second embodiments, the output of the turbine speed sensor 178 is directly used by the speed variation monitoring means 198 and the turbine speed variation amplitude monitoring means 220 to detect the speed $N_T$ of the turbine impeller 22, namely, the speed $N_{IN}$ of the input shaft 20 of the automatic transmission 14. However, the turbine impeller speed $N_T$ may be calculated by using other speed sensors such as the vehicle speed sensor 168 adapted to detect the speed $N_{OUT}$ of the output shaft 40 of the automatic transmission 14, or a wheel speed sensor adapted to detect the rotating speed of a vehicle wheel. Where the vehicle speed sensor 168 is used, the turbine impeller speed $N_T$ may be calculated by multiplying the output shaft speed $N_{OUT}$ of the transmission 14 by a currently selected speed ratio of the transmission 14. Where the wheel speed sensor is used, the turbine impeller speed $N_T$ may be calculated by multiplying the wheel speed by the speed ratio of the transmission 14 and the speed reduction ratio i of the final gear device. In these cases where the turbine impeller speed $N_T$ is calculated from the speed $N_{OUT}$ or wheel speed, the turbine speed sensor 178 is not essential.

Further, the speed variation monitoring means 198 may use the speed $N_{OUT}$, wheel speed or other parameter in place of the turbine impeller speed $N_T$, to monitor a variation in the speed $N_T$ of the turbine impeller 22 on the basis of a variation in such parameter, as long as the variation in the parameter used substantially represents a variation in the turbine impeller speed speed $N_T$.

In the illustrated first embodiment, the routine of FIG. 11 is adapted such that the JUDDER DETERMINATION counter CJADA counts the number of those variations of the turbine impeller speed $N_T$ whose amplitude DNTJ is not smaller than the lower limit tKDNTJA, that is, the affirmative decision is obtained in step SO72 if the variation amplitude DNTJ is equal to or larger than the lower limit tKDNTJA. However, step SO72 may be modified to determine whether the variation amplitude DNTJ is held within a predetermined range between predetermined upper and lower limits. Generally, the variation amplitude DNTJ of the turbine impeller speed $N_T$ during vehicle running on a poor or bumpy road surface is not stable within a certain range, and is usually larger than the amplitude of a variation which takes place due to a judder of the lock-up clutch 32. The above modification permits reduced influence of the road surface condition (bumpy road surface) on the content of the JUDDER DETERMINATION counter CJADA.

Further, the threshold values tKNAKURO and tKNRYORO used by the second variation number monitoring means 216 in steps SO15 and SO18 may be the same.

In the second embodiment, step SO76 of the sub-routine of FIG. 20 corresponding to a part of the judder determining means 228 is arranged to effect the first determination as to whether the variation amplitude $SN_T$ of the turbine impeller speed $N_T$ is larger than the product ($SN_{OUT} \times i$) of the output speed $N_{OUT}$ and speed ratio i of the automatic transmission 14, and the second determination as to whether the phase difference D is larger than the reference value $C_{PH}$, so that step SO75 is implemented if the affirmative decision is obtained in at least one of the first and second determinations. However, the step SO76 may be arranged to effect only one of those first and second determinations. Further, the step SO76 may be modified to implement step SO75 if the affirmative decision is obtained in both of the first and second determinations. This modification improves the accuracy of determination by the judder determining means 228.

In the second embodiment, the first determination in step SO76 as to whether $SN_T > (SN_{OUT} \times i)$ may be replaced by a determination as to whether $SN_T/SN_{OUT} > i$.

Further, the first determination in step SO76 as to whether $SN_T > (SN_{OUT} \times i)$ may be replaced by a determination as to whether $SN_T > (SN_{OUT} \times i) + C1$, where C1 is a suitably determined constant, or by a determination as to whether $SN_T/SN_{OUT} > C2$, where C2 is a constant larger than i. These determinations are substantially the same as the determination in step SO76 of FIG. 20 in the illustrated second embodiment.

In the second embodiment, the second determination as to whether $D > C_{PH}$ may be replaced by a determination as to whether $t_{OUT} > t_T + C_{PH}$, where $t_T$ and $t_{OUT}$ represent points of time at which the peaks $P_T$ and $P_{OUT}$ are detected, respectively, and $C_{PH}$ is a suitably determined constant. Since the phase difference is equal to $(t_{OUT} - t_T)$, the above inequality $t_{OUT} > t_T + C_{PH}$ is substantially identical to an equality $D > C_{PH}$.

The sub-routine of FIG. 20 may be modified so that the affirmative decision (YES) is obtained in step SO76 if the following four inequalities are all satisfied:

1) $SN_T/SN_{OUT} > i$
2) $SN_T > (SN_{OUT} \times i) + C1$
3) $SN_T/SN_{OUT} > C2$
4) $t_{OUT} > t_T + C_{PH}$ The above modification permits further improved accuracy of determination by the judder determining means 228.

In the second embodiment, the PROVISIONAL JUDDER DETERMINATION flag XJRDY is set to "1" in step SO9 in the flag setting routine of FIG. 10 if the content of the JUDDER DETERMINATION counter CJADA is increased to the predetermined threshold tKNJADA. In this case, the slip control of the lock-up clutch 32 is interrupted in step SN9 of the slip control routine of FIG. 9. If the number of variations of the turbine impeller speed $N_T$ is smaller than the threshold tKNAKURO during a predetermined period of the interruption of the slip control of the lock-up clutch 32, that is, if the negative decision is obtained in step SO15, the SLIP CONTROL flag XJLB1 is set to "1" in step SO17 because the negative decision in step SO15 means that the lock-up clutch 32 suffered from a judder which involved a large number of periodic variations of the speed $N_T$. In this case, the slip control of the lock-up clutch 32 is continuously interrupted or inhibited. However, if the determination by the judder determining means 228 in step SO76 is highly reliable or accurate, steps SO75 of the sub-routine of FIG. 20 and step SO8 of the flag setting routine of FIG. 10 may be eliminated. In this instance, step SO9 is implemented if the affirmative decision (YES) is obtained in step SO76.

While the illustrated embodiments use the PROVISIONAL JUDDER DETERMINATION flag XJRDY which is set to "1" in step SO9, it is possible to set the SLIP CONTROL INHIBIT flag XJLB1 to "1" in step SO9 if the affirmative decision (YES) is obtained in step SO8 or SO76. In this case, steps SO10 through SO23 may be eliminated.

While the speed $N_T$ of the turbine impeller 22 detected by the turbine speed sensor 178 is used in the illustrated embodiments, the speed $N_T$ may be replaced by a speed of a rotating member directly or indirectly fixed to the turbine impeller 22, for example, the speed $N_{IN}$ of the input shaft 20 of the transmission 14. Any speed whose variation substantially indicates a variation of the turbine impeller speed $N_T$ may be used. Similarly, the speed $N_{OUT}$ of the output shaft 40 of the transmission 14 may be replaced by a speed of a rotating member directly or indirectly fixed to the output shaft 40, such as the speed of a propeller shaft, an axle or a wheel of the vehicle. Any speed whose variation substantially indicates a variation of the output shaft speed $N_{OUT}$ may be used.

It is to be understood that the present invention may be embodied with various other changes, modifications and improvements, which may occur to those skilled in the art, without departing from the spirit and scope of the invention defined in the following claims.

What is claimed is:

1. An apparatus for controlling an amount of slip of a lock-up clutch disposed between a pump impeller and a turbine impeller in a power transmitting system of a motor vehicle, said apparatus comprising:

slip control means for controlling the amount of slip of said lock-up clutch such that an actual slip speed of said lock-up clutch coincides with a predetermined target slip speed;

speed variation monitoring means for detecting variations of a rotating speed of said turbine impeller;

judder determining means connected to said speed variation monitoring means, for determining the presence or absence of a judder of said lock-up clutch on the basis of the number of said variations detected by said speed variation monitoring means during slip control of said lock-up clutch by said slip control means, and for inhibiting operation of said slip control means if in the presence of said judder;

variation amplitude determining means connected to said speed variation monitoring means, for determining an amplitude of each of said variations of said rotating speed of said turbine impeller which have been detected by said speed variation monitoring means; and amplitude change monitoring means connected to said variation amplitude determining means, for determining, on the basis of the amplitudes of two successive variations determined by said variation amplitude determining means, whether an amount of change of the amplitudes of said two successive variations is larger than a predetermined upper limit, and inhibiting said judder determining means from using at least a latter one of said two successive variations for the determination of the presence or absence of said judder of said lock-up clutch, if said amount of change determined is larger than said predetermined upper limit.

2. An apparatus according to claim 1, wherein said speed variation monitoring means detects, as each of said variations of the rotating speed of said turbine impeller, two adjacent upper and lower peaks of a waveform of said rotating speed, and said variation amplitude determining means determines, as said amplitude of said each variation, a difference between said two adjacent upper and lower peaks of said waveform of said rotating speed.

3. An apparatus according to claim 2, wherein said predetermined upper limit of said amount of change of the amplitudes of said two successive variations is determined such that said amount of change is larger than said predetermined upper limit where said variations of the rotating speed of said turbine impeller are caused due to passage of the motor vehicle through a relatively narrow local raised or recessed area of a generally good road surface during said slip control of said lock-up clutch by said slip control means.

4. An apparatus according to claim 1, wherein said judder determining means includes:

first variation number monitoring means for determining whether the number of the variations of the rotating speeds of said turbine impeller which are detected by said speed variation monitoring means during the slip control of said lock-up clutch by said slip control means is smaller than a predetermined first threshold;

slip control interrupting means for interrupting said slip control of the lock-up clutch by said slip control means, if said first variation number monitoring means determines that the number of said variations detected by said speed variation monitoring means during said slip control is not smaller than said predetermined first threshold; and second variation number monitoring means for determining whether the number of the variations of the rotating speed of said turbine impeller which are detected by said speed variation monitoring means during interruption of said slip control by said slip control interrupting means is smaller than a predetermined second threshold.

5. An apparatus according to claim 4, wherein said slip control interrupting means includes a provisional judder determination flag which is set when said first variation number monitoring means determines that the number of said variations detected by said speed variation monitoring means is not smaller than said predetermined first threshold, said slip control means being disabled when said provisional judder determination flag is set.

6. An apparatus according to claim 4, further comprising slip control resuming means for resuming said slip control of said lock-up clutch which has been interrupted by said slip control interrupting means, if said second variation number monitoring means determines that the number of said variations detected by said speed variation monitoring means during the interruption of said slip control is not smaller than said predetermined second threshold.

7. An apparatus according to claim 6, wherein said second variation number monitoring means includes first monitoring means for determining whether the number of the variations of the rotating speed of said turbine impeller detected in an initial portion of a time duration of said interruption of said slip control is smaller than said predetermined second threshold value, and second monitoring means for determining whether the number of the variations of the rotating speed of said turbine impeller detected in a latter portion of said time duration of said interruption of said slip control which follows said initial portion is smaller than a predetermined third threshold, said slip control resuming means resuming said slip control of the lock-up clutch if said second monitoring means determines that the number of the variations detected in said latter portion of said interruption of said slip control is smaller than said predetermined third threshold, after said first monitoring means determines that the number of the variations detected in said initial portion is not smaller than said predetermined second threshold.

8. An apparatus according to claim 7, wherein said predetermined second threshold is determined such that said number of the variations of the rotating speed of said turbine impeller detected by said first monitoring means of said speed variation monitoring means during said initial portion of said time duration of said interruption of said slip control of said lock-up clutch is not smaller than said predetermined second threshold where said variations during said interruption are caused due to running of the motor vehicle on a generally bumpy road surface during said interruption.

9. An apparatus according to claim 7, further comprising slip control terminating means for terminating said slip control of said lock-up clutch if said first monitoring means of said second variation number monitoring means determines that the number of said variations of the rotating speed of said turbine impeller detected by said speed variation monitoring means during said initial portion of said time duration of said interruption of said slip control is smaller than said predetermined second threshold.

10. An apparatus according to claim 1, further comprising:

variation period determining means for determining a period of each of said variations of said rotating speed of said turbine impeller which have been detected by said speed variation monitoring means; and variation period monitoring means for determining whether said period determined by said variation period determining means is outside a predetermined range, and inhibiting said judder determining means from using each of said variations whose periods are outside said predetermined range.

11. An apparatus for controlling an amount of slip of a lock-up clutch disposed between a pump impeller and a turbine impeller in a power transmitting system of a motor vehicle, said apparatus comprising:

slip control means for controlling the amount of slip of said lock-up clutch such that an actual slip speed of said lock-up clutch coincides with a predetermined target slip speed;

speed variation monitoring means for detecting variations of a rotating speed of said turbine impeller;

judder determining means connected to said speed variation monitoring means, for determining the presence or absence of a judder of said lock-up clutch on the basis of the number of said variations detected by said speed variation monitoring means during slip control of said lock-up clutch by said slip control means, and for inhibiting operation of said slip control means in the presence of said judder;

variation period determining means connected to said speed variation monitoring means, for determining a period of each of said variations of said rotating speed of said turbine impeller which have been detected by said speed variation monitoring means; and variation period monitoring means connected to said variation period determining means, for determining whether said period determined by said variation period determining means is outside a predetermined range, and inhibiting said judder determining means from using each of said variations whose periods are outside said predetermined range.

12. An apparatus according to claim 11, wherein said predetermined range of said period is determined such that periods of said variations of the rotating speed of said turbine impeller are held within said predetermined range where said variations are caused due to the presence of said judder of said lock-up clutch during the slip control thereof by said slip control means.

13. An apparatus according to claim 11, wherein said judder determining means includes:

first variation number monitoring means for determining whether the number of the variations of the rotating speeds of said turbine impeller which are detected by said speed variation monitoring means during the slip control of said lock-up clutch by said slip control means is smaller than a predetermined first threshold;

slip control interrupting means for interrupting said slip control of the lock-up clutch by said slip control means, if said first variation number monitoring means determines that the number of said variations detected by said speed variation monitoring means during said slip control is not smaller than said predetermined first threshold; and second variation number monitoring means for determining whether the number of the variations of the rotating speed of said turbine impeller which are detected by said speed variation monitoring means during interruption of said slip control by said slip control interrupting means is smaller than a predetermined second threshold.

14. An apparatus according to claim 13, wherein said slip control interrupting means includes a provisional judder determination flag which is set when said first variation number monitoring means determines that the number of said variations detected by said speed variation monitoring means is not smaller than said predetermined first threshold, said slip control means being disabled when said provisional judder determination flag is set.

15. An apparatus according to claim 13, further comprising slip control resuming means for resuming said slip control of said lock-up clutch which has been interrupted by said slip control interrupting means, if said second variation number monitoring means determines that the number of said variations detected by said speed variation monitoring means during the interruption of said slip control is not smaller than said predetermined second threshold.

16. An apparatus according to claim 15, wherein said second variation number monitoring means includes first monitoring means for determining whether the number of the variations of the rotating speed of said turbine impeller detected in an initial portion of a time duration of said interruption of said slip control is smaller than said predetermined second threshold value, and second monitoring means for determining whether the number of the variations of the rotating speed of said turbine impeller detected in a letter portion of said time duration of said interruption of said slip control which follows said initial portion is smaller than a predetermined third threshold, said slip control resuming means resuming said slip control of the lock-up clutch if said second monitoring means determines that the number of the variations detected in said latter portion of said interruption of said slip control is smaller than said predetermined third threshold, after said first monitoring means determines that the number of the variations detected in said initial portion is not smaller than said predetermined second threshold.

17. An apparatus according to claim 16, wherein said predetermined second threshold is determined such that said number of the variations of the rotating speed of said turbine impeller detected by said first monitoring means of said speed variation monitoring means during said initial portion of said time duration of said interruption of said slip control of said lock-up clutch is not smaller than said predetermined second threshold where said variations during said interruption are caused due to running of the motor vehicle on a generally bumpy road surface during said interruption.

18. An apparatus according to claim 16, further comprising slip control terminating means for terminating said slip control of said lock-up clutch if said first monitoring means of said second variation number monitoring means determines that the number of said variations of the rotating speed of said turbine impeller detected by said speed variation monitoring means during said initial portion of said time duration of said interruption of said slip control is smaller than said predetermined second threshold.

19. An apparatus for controlling an amount of slip of a lock-up clutch disposed between a pump impeller and a turbine impeller of a fluid-filled power transmitting device which is disposed between an engine and an automatic transmission of a motor vehicle such that an output torque of the engine is transmitted to the automatic transmission through said power transmitting device, said automatic transmission having an output shaft operatively connected to a drive wheel of the vehicle, said apparatus comprising:

slip control means for controlling the amount of slip of said lock-up clutch such that an actual slip speed of the lock-up clutch coincides with a predetermined target slip speed;

turbine speed variation amplitude monitoring means for determining a variation amplitude of a rotating speed of said turbine impeller;

output speed variation amplitude monitoring means for determining a variation amplitude of a rotating speed of said output shaft of said automatic transmission;

speed ratio determining means for determining a speed ratio of said automatic transmission; and judder determining means connected to said turbine speed variation amplitude monitoring means, said output speed variation amplitude monitoring means and said speed ratio determining means, for determining the presence or absence of a judder of said lock-up clutch on the basis of said variation amplitude of the rotating speed of said turbine impeller as compared with a product of said variation amplitude of the rotating speed of said output speed and said actual speed ratio of said automatic transmission, and for inhibiting operation of said slip control means in the presence of said judder.

20. An apparatus according to claim 19, wherein said judder determining means determines that said lock-up clutch is juddering, if said variation amplitude of the rotating speed of said turbine impeller is larger than said product.

21. An apparatus according to claim 19, wherein said judder determining means determines that said lock-up clutch is juddering, if said variation amplitude of the rotating speed of said turbine impeller is larger than a sum of said product and a predetermined constant.

22. An apparatus according to claim 19, wherein said judder determining means determines that said lock-up clutch is juddering, if a ratio of said variation amplitude of the rotating speed of said turbine impeller to said variation amplitude of the rotating speed of said output shaft is larger than said speed ratio.

23. An apparatus according to claim 19, further comprising slip control terminating means for terminating slip control of said lock-up clutch by said slip control means if said judder determining means determines that said lock-up clutch is juddering.

24. An apparatus according to claim 19, further comprising variation change monitoring means for determining whether an amount of change of the amplitudes of two successive variations of the rotating speed of said turbine impeller which have been determined by said turbine speed variation amplitude monitoring means is larger than a predetermined upper limit, and inhibiting said judder determining means from using at least a latter one of said two successive variations for the determination of the presence or absence of said judder of said lock-up clutch, if said amount of change determined is larger than said predetermined upper limit.

25. An apparatus according to claim 19, further comprising:

speed variation monitoring means for detecting variations of the rotating speed of said turbine impeller;

variation period determining means for determining a period of each of variations of the rotating speed of said turbine impeller which have been detected by said speed variation monitoring means; and variation period monitoring means for determining whether said period determined by said variation period determining means is outside a predetermined range, and inhibiting said judder determining means from using each of said variations whose periods are outside said predetermined range.

26. An apparatus for controlling an amount of slip of a lock-up clutch disposed between a pump impeller and a turbine impeller of a fluid-filled power transmitting device which is disposed between an engine and an automatic transmission of a motor vehicle such that an output torque of the engine is transmitted to the automatic transmission through said power transmitting device, said automatic transmission having an output shaft operatively connected to a drive wheel of the vehicle, said apparatus comprising:

slip control means for controlling the amount of slip of said lock-up clutch such that an actual slip speed of the lock-up clutch coincides with a predetermined target slip speed;

a turbine speed sensor for detecting a rotating speed of said turbine impeller;

an output speed sensor for detecting a rotating speed of said output shaft of said automatic transmission;

phase difference determining means connected to said turbine speed sensor and said output speed sensor, for determining a phase difference between a variation waveform of the rotating speed of said turbine impeller and a variation waveform of the rotating speed of said output shaft; and judder determining means connected to said phase difference determining means, for determining the presence or absence of a judder of said lock-up clutch on the basis of said phase difference determined by said phase difference determining means, as compared with a predetermined reference value, and for inhibiting operation of said slid control means in the presence of said judder.

27. An apparatus according to claim 26, wherein said judder determining means determines that said lock-up clutch is juddering, if a phase of said variation waveform of the rotating speed of said output shaft is advanced with respect to a phase of said variation waveform of the rotating speed of said turbine impeller by more than said predetermined reference value.

28. An apparatus according to claim 26, further comprising slip control terminating means for terminating slip control of said lock-up clutch by said slip control means if said judder determining means determines that said lock-up clutch is juddering.

29. An apparatus according to claim 26, further comprising variation change monitoring means for determining whether an amount of change of the amplitudes of two successive variations of the rotating speed of said turbine impeller which have been determined by said turbine speed variation amplitude monitoring means is larger than a predetermined upper limit, and inhibiting said judder determining means from using at least a latter one of said two successive variations for the determination of the presence or absence of said judder of said lock-up clutch, if said amount of change determined is larger than said predetermined upper limit.

30. An apparatus according to claim 26, further comprising:

speed variation monitoring means for detecting variations of the rotating speed of said turbine impeller;

variation period determining means for determining a period of each of variations of the rotating speed of said turbine impeller which have been detected by said speed variation monitoring means; and variation period monitoring means for determining whether said period determined by said variation period determining means is outside a predetermined range, and inhibiting said judder determining means from using each of said variations whose periods are outside said predetermined range.

31. An apparatus according to claim 26, further comprising:

turbine speed variation amplitude monitoring means for determining a variation amplitude of the rotating speed of said turbine impeller;

output speed variation amplitude monitoring means for determining a variation amplitude of the rotating speed of said output shaft of said automatic transmission; and speed ratio determining means for determining a speed ratio of said automatic transmission;

and wherein said judder determining means effecting a first determination as to whether said variation amplitude of the rotating speed of said turbine impeller is larger than a product of said variation amplitude of the rotating speed of said output speed and said actual speed ratio of said automatic transmission, and a second determination as to whether said phase difference is larger than said predetermined reference value, said judder determining means determining the presence of said judder of said lock-up clutch if an affirmative decision is obtained in at least one of said first and second determinations.

\* \* \* \* \*